US009844762B2

(12) United States Patent
Worsley et al.

(10) Patent No.: US 9,844,762 B2
(45) Date of Patent: Dec. 19, 2017

(54) NANOPOROUS METAL-CARBON COMPOSITE

(71) Applicant: LAWRENCE LIVERMORE NATIONAL SECURITY, LLC, Livermore, CA (US)

(72) Inventors: Marcus A. Worsley, Hayward, CA (US); Joe Satcher, Patterson, CA (US); Sergei Kucheyev, Oakland, CA (US); Supakit Charnvanichborikarn, Livermore, CA (US); Jeffrey Colvin, Pleasanton, CA (US); Thomas Felter, Livermore, CA (US); Sangil Kim, Pleasanton, CA (US); Matthew Merrill, Dublin, CA (US); Christine Orme, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 279 days.

(21) Appl. No.: 14/485,474

(22) Filed: Sep. 12, 2014

(65) Prior Publication Data
US 2016/0101398 A1    Apr. 14, 2016

(51) Int. Cl.
| | | |
|---|---|---|
| *A61L 15/32* | (2006.01) | |
| *B01J 13/00* | (2006.01) | |
| *C01B 31/04* | (2006.01) | |
| *C01B 31/02* | (2006.01) | |

(52) U.S. Cl.
CPC ........ *B01J 13/0091* (2013.01); *C01B 31/022* (2013.01); *C01B 31/0253* (2013.01); *C01B 31/043* (2013.01); *C01B 31/0438* (2013.01); *C01B 31/0484* (2013.01); *C01P 2006/10* (2013.01)

(58) Field of Classification Search
CPC ............. B01J 13/0091; C08B 31/0091; C08B 31/043; C08B 31/0484
See application file for complete search history.

(56) References Cited

U.S. PATENT DOCUMENTS

| | | | |
|---|---|---|---|
| 4,970,189 A | * | 11/1990 | Tachibana ............. C04B 35/528 |
| | | | 502/182 |
| 8,629,076 B2 | | 1/2014 | Worsley et al. |
| 8,658,287 B2 | | 2/2014 | Berglund et al. |
| 8,664,143 B2 | | 3/2014 | Worsley et al. |
| 8,809,230 B2 | | 8/2014 | Worsley et al. |
| 2012/0034442 A1 | | 2/2012 | Pauzauskie et al. |
| 2014/0121425 A1 | | 5/2014 | Worsley et al. |

(Continued)

OTHER PUBLICATIONS

Ajayan, P.M. et al. (1993) "Capillarity-induced filling of carbon nanotubes," Nature 361:333-334.

(Continued)

*Primary Examiner* — Alexander Polyansky
(74) *Attorney, Agent, or Firm* — Foley & Lardner LLP

(57) ABSTRACT

Described here is a metal-carbon composite, comprising (a) a porous three-dimensional scaffold comprising one or more of carbon nanotubes, graphene and graphene oxide, and (b) metal nanoparticles disposed on said porous scaffold, wherein the metal-carbon composite has a density of 1 g/cm³ or less, and wherein the metal nanoparticles account for 1 wt. % or more of the metal-carbon composite. Also described are methods for making the metal-carbon composite.

17 Claims, 20 Drawing Sheets

(56) References Cited

U.S. PATENT DOCUMENTS

| | | |
|---|---|---|
| 2014/0178289 A1 | 6/2014 | Worsley et al. |
| 2014/0178759 A1 | 6/2014 | Worsley et al. |
| 2015/0004087 A1 | 1/2015 | Zettl et al. |

OTHER PUBLICATIONS

Aroutiounian, V. (2007) "Metal oxide hydrogen, oxygen, and carbon monoxide sensors for hydrogen setups and cells," International Journal of Hydrogen Energy 32(9):1145-1158.

Balandin, A.A. et al. (2008) "Superior Thermal Conductivity of Single-Layer Graphene," Nano Letters 8(3):902-907.

Baumann, T.F. et al. (2002) "Synthesis and Characterization of Copper-Doped Carbon Aerogels," Langmuir 18(18):7073-7076.

Black, J.R. (1969) "Electromigration—A Brief Survey and Some Recent Results," IEEE Transactions on Electron Devices 16(4):338-347.

Blech, I.A. (1976) "Electromigration in thin aluminum films on titanium nitride," Journal of Applied Physics 47(4):1203-1208.

Brauns, E. et al. (2013) "A miniaturized catalytic gas sensor for hydrogen detection based on stabilized nanoparticles as catalytic layer," Sensors and Actuators B 187:420-425.

Buttner, W. et al. (2011) Summary and Findings from the NREL/DOE Hydrogen Sensor Workshop:1-90.

Cai, D. et al. (2007) "Glucose sensors made of novel carbon nanotube-gold nanoparticle composites," Biofactors 30(4):271-277.

Charnvanichborikarn, S. et al. (2014) "Nanoporous Cu—C composites based on carbon-nanotube aerogels," Journal of Materials Chemistry A 2:962-967.

Chen, P. et al. (1999) "Synthesis of Cu Nanoparticles and Microsized Fibers by Using Carbon Nanotubes as a Template," The Journal of Physical Chemistry B 103(22):4559-4561.

Cioffi, N. et al. (2005) "Copper Nanoparticle/Polymer Composites with Antifungal and Bacteriostatic Properties," Chemistry of Materials 17(21):5255-5262.

Daugherty, M. et al. (1999) "Low Cost Hydrogen Sensors for Hydrogen Fuel Safety," Proceedings of the U.S. DOE Hydrogen Program Review:937-941.

Düsco, C. et al. (2003) "Explosion-proof monitoring of hydrocarbons by mechanically stabilized, integrated calorimetric microsensors," Sensors and Actuators B 95:189-194.

Esteban-Cubillo, A. et al. (2006) "Antibacterial activity of copper monodispersed nanoparticles into sepiolite," J. Mater. Sci. 41:5208-5212.

Fu, R. et al. (2005) "Formation of Graphitic Structures in Cobalt- and Nickel-Doped Carbon Aerogels," Langmuir 21:2647-2651.

Gall, M. (1991) "The Si Planar Pellistor: a Low-power Pellistor Sensor in Si Thin-film Technology," Sensors and Actuators B 4:533-538.

Hodge, A.M. et al. (2006) "Characterization and Mechanical Behavior of Nanoporous Gold," Advanced Engineering Materials 8(9):853-857.

Houlet, L.F. et al. (2008) "Thermopile sensor-devices for the catalytic detection of hydrogen gas," Sensors and Actuators B 130:200-206.

Hübert, T. et al. (2011) "Hydrogen sensors—A review," Sensors and Actuators B 157:329-352.

Jain, P. et al. (2005) "Potential of Silver Nanoparticle-Coated Polyurethane Foam as an Antibacterial Water Filter," Biotechnology and Bioengineering 90(1):59-63.

Kim, B-J. et al. (2008) "A study on the hydrogen storage capacity of Ni-plated porous carbon nanofibers," International Journal of Hydrogen Energy 33:4112-4115.

Kimura, M. et al. (2011) "MEMS Hydrogen Gas Sensor for the Entire Concentration Range of Hydrogen Gas," Sensors and Materials 23(7):419-434.

Kinoshita, K. et al. (1974) "The thermal decomposition of platinum(II) and (IV) complexes," Thermochimica Acta 10:109-117.

Kong, J. et al. (2001) "Functionalized Carbon Nanotubes for Molecular Hydrogen Sensors," Adv. Mater. 13(18):1384-1386.

Korotcenkov, G. et al. (2009) "Review of Electrochemical Hydrogen Sensors," Chemical Reviews 109:1402-1433.

Lee, B.J. et al. (2007) "Carbon nanofibre/hydrous $RuO_2$ nanocomposite electrodes for supercapacitors," Journal of Power Sources 168:546-552.

Lee, E-B. et al. (2011) "Micromachined catalytic combustible hydrogen gas sensor," Sensors and Actuators B 153:392-397.

Lee, D-D. et al. (1996) "Low-power micro gas sensor," Sensors and Actuators B: Chemical 33:147-150.

Li, B. et al. (2011) "$Cu_2O$@reduced graphene oxide composite for removal of contaminants from water and supercapacitors," J. Mater. Chem. 21:10645-10648.

Lu, G. et al. (2007) "Electrostatic-Force-Directed Assembly of Ag Nanocrystals onto Vertically Aligned Carbon Nanotubes," J. Phys. Chem. C 111:17919-17922.

Lv, W. et al. (2011) "A sandwich structure of graphene and nickel oxide with excellent supercapactive performance," J. Mater. Chem. 21:9014-9019.

Mickelson, W. et al. (2012) "Low-power, fast, selective nanoparticle-based hydrogen sulfide gas sensor," Appl. Phys. Lett. 100:173110-1-173110-4.

Mishra, Y.K. et al. (2007) "Gold-silica nanocomposites for the detection of human ovarian cancer cells: a preliminary study," Nanotechnology 18:345606(5pp).

Nan, H.Y. et al. (2013) "The thermal stability of graphene in air investigated by Raman spectroscopy," Journal of Raman Spectroscopy 44:1018-1021.

Qian, Y. et al. (2011) "Preparation of $MnO_2$/grapheme composite as electrode material for supercapacitors," J. Mater. Sci. 46:3517-3522.

Rousseas, M. et al. (2013) "Synthesis of Highly Crystalline $sp^2$-Bonded Boron Nitride Aerogels," ACS Nano 7(10):8540-8546.

Shin, W. et al. (2005) "Planar catalytic combustor film for thermoelectric hydrogen sensor," Sensors and Actuators B 108:455-460.

Simon, I. et al. (2002) "Thermal and gas-sensing properties of a micromachined thermal conductivity sensor for the detection of hydrogen in automotive applications," Sensors and Actuators A 97-98:104-108.

Skarupo, S. (2007) "A Nanotechnology Test System," EE Evaluation Engineering 46:44-48.

Son, W.K. et al. (2006) "Antimicrobial cellulose acetate nanofibers containing silver nanoparticles," Carbohydrate Polymers 65:430-434.

Stetter, J.R. et al. (2008) "Amperometric Gas Sensors: A Review," Chemical Reviews 108:352-366.

Tan, X. et al. (2009) "Carbon nanotube-supported gold nanoparticles as efficient catalysts for selective oxidation of cellobiose into gluconic acid in aqueous medium," Chem. Commun. 46:7179-7181.

Wang, C. et al. (2008) "Tailored cutting of carbon nanotubes and controlled dispersion of metal nanoparticles inside their channels," J. Mater. Chem. 18:5782-5786.

Wang, L. et al. (2008) "Hydrogen Storage Properties of Carbons Doped with Ruthenium, Platinum, and Nickel Nanoparticles," J. Phys. Chem. C 112:12486-12494.

Wittstock, A. et al. (2012) "Chapter 1: Introduction to Nanoporous Gold," RSC Nanoscience & Nanotechnology 22:1-10.

Worsley, M.A. et al. (2010) "Synthesis of Graphene Aerogel with High Electrical Conductivity," J Am Chem Soc. 132:14067-14069.

Worsley, M.A. et al. (2012) "Mechanically robust 3D graphene macroassembly with high surface area," Chem Commun. 48:8428-8430.

Wu, Z-S. et al. (2010) "Graphene Anchored with $Co_3O_4$ Nanoparticles as Anode of Lithium Ion Batteries with Enhanced Reversible Capacity and Cyclic Performance," ACS Nano 4(6):3187-3194.

Yan, J. et al. (2010) "Rapid microwave-assisted synthesis of graphene nanosheet/$Co_3O_4$ composite for supercapacitors," Electrochimica Acta 55:6973-6978.

(56) References Cited

OTHER PUBLICATIONS

Yu, S. et al. (2005) "Fabrication of Palladium Nanotubes and Their Application in Hydrogen Sensing," Chemistry of Materials 17:3445-3450.

* cited by examiner (B)

(A)

NANOPOROUS METAL-CARBON COMPOSITE

FEDERAL FUNDING STATEMENT

This invention was made with government support under Contract No. DE-AC52-07NA27344 awarded by the U.S. Department of Energy. The government has certain rights in this invention.

BACKGROUND

Porous metals and metal-carbon composites with nanoscale dimensions of struts or pore walls have a number of current and potential applications. For example, nanostructured Au could be used for molecular detectors and sensors or as a catalyst; Pd is attractive for hydrogen gas sensors; Cu and Ag nanoparticles are of interest to applications capitalizing on their antimicrobial and bactericidal activity. Other nanostructured metals (such as Ru, Pt, and Ni) and metal oxides (such as $MnO_2$, $Co_3O_4$, $Cu_2O$, NiO, and $RuO_2$) are attractive for energy storage devices. Nanoporous metal-carbon composites could capitalize on the large surface areas and attractive mechanical properties of the nanoporous carbon scaffold and the functionalities of metal nanoparticles. Moreover, ultralow density (<50 $mg/cm^3$) nanostructured porous metals are attractive as targets for ultrabright x-ray sources.

Although a number of methods have been proposed to form different metal-CNT composites, little has been done to fabricate macroscopically sized three-dimensional metal-carbon composites with controlled dimensions, density, composition, pore size distributions, and mechanical properties. The sol-gel approach is commonly used to synthesize monolithic nanoporous carbons. For metal-carbon composites, however, it is challenging to achieve both high metal loading and low monolith densities. Thus, a need exists for new nanoporous metal-carbon composites with tunable properties and methods for making them.

SUMMARY

Described herein are macroscopically-sized three-dimensional monolithic metal-carbon composites having both high metal loading and low densities and methods for making the metal-carbon composites.

One aspect of some embodiments of the invention described herein relates to a metal-carbon composite, comprising (i) a porous scaffold comprising one or more of carbon nanotubes, graphene and graphene oxide, and (b) metal nanoparticles disposed on said porous scaffold, wherein the metal-carbon composite has a density of 1 $g/cm^3$ or less, and wherein the metal nanoparticles account for 1 wt. % or more of the metal-carbon composite.

In some embodiments, the metal is selected from the group consisting of Cu, Ag, Au, Pt, Pd, Co, Ni, W, Mo, Fe, Si, Ta, rare earth metals, and other transition metals. In some embodiments, the metal is selected from the group consisting of Cu, Ag, Au, and Pt.

In some embodiments, the porous scaffold comprising a three-dimensional network of graphene sheets crosslinked by covalent bonds. In some embodiments, the porous scaffold comprising a three-dimensional network of graphene oxide sheets crosslinked by covalent bonds. In some embodiments, the porous scaffold comprising a three-dimensional network of carbon nanotubes crosslinked by carbon nanoparticles. In some embodiments, the metal-carbon composite is nanoporous.

In some embodiments, the metal-carbon composite has a density of 200 $mg/cm^3$ or less, and the metal nanoparticles account for 3 wt. % or more of the metal-carbon composite. In some embodiments, the metal-carbon composite has a density of 100 $mg/cm^3$ or less, and the metal nanoparticles account for 5 wt. % or more of the metal-carbon composite. In some embodiments, the metal-carbon composite has a density of 80 $mg/cm^3$ or less, and the metal nanoparticles account for 10 wt. % or more of the metal-carbon composite.

In some embodiments, carbon and metal account for 90 at. % or more of the metal-carbon composite.

In some embodiments, the metal-carbon composite is not an xerogel or microsphere. In some embodiments, the metal-carbon composite is not made by ion exchange.

A second aspect of some embodiments of the invention described herein relates to a method for making a metal-carbon composite, comprising (a) providing an aqueous mixture comprising (i) at least one of carbon nanotube and graphene oxide and (ii) at least one metal salt or metal nanowire; (b) freezing the mixture to obtain a cryo-composite; (c) drying the cryo-composite to obtain a dry composite; and (d) reducing the dry composite to obtain the metal-carbon composite.

In some embodiments, step (d) comprises pyrolyzing the dry gel in a reducing environment.

In some embodiments, the metal salt or metal nanowire is a copper or silver salt or nanowire.

A third aspect of some embodiments of the invention described herein relates to a method for making a metal-carbon composite, comprising (a) providing an aqueous mixture comprising (i) graphene oxide, (ii) at least one metal salt, and (iii) at least one catalyst; (b) curing the reaction mixture to produce a wet gel; (c) washing and drying the wet gel to obtain a metal-graphene oxide aerogel comprising a graphene oxide scaffold.

In some embodiments, the method further comprises (d) reducing the metal-graphene oxide aerogel to produce a metal-graphene aerogel comprising a graphene scaffold, wherein carbon and metal account for 90 at. % or more of the metal-graphene aerogel.

In some embodiments, the method further comprises (e) removing the graphene oxide scaffold to obtain a metal aerogel.

In some embodiments, the metal salt is a gold salt.

A fourth aspect of some embodiments of the invention described herein relates to a method for making a metal-carbon composite, comprising (a) providing an aqueous mixture comprising (i) carbon nanotubes, (ii) at least one metal nanoparticles, and optionally (iii) at least one surfactant of the metal nanoparticles; (b) curing the reaction mixture to produce a wet gel; (c) washing and drying the wet gel to obtain a carbon nanotube-metal nanoparticle composite.

In some embodiments, the method further comprising (d) reducing the carbon nanotube-metal nanoparticle composite to produce a metal-carbon composite, wherein carbon and metal account for 90 at. % or more of the metal-carbon composite.

In some embodiments, the metal nanoparticles are copper nanoparticles.

A fifth aspect of some embodiments of the invention described herein relates to a method for making a metal-carbon composite, comprising (a) providing a carbon aerogel; (b) immersing said carbon aerogel in an aqueous solution comprising at least one metal salt; (c) freeze drying the carbon aerogel in a vacuum to obtain a metal salt-impregnated carbon aerogel; and (d) reducing the metal salt-impregnated carbon aerogel to obtain the metal-carbon composite.

In some embodiments, the metal salt is selected from a platinum salt and a copper salt.

These and other features, together with the organization and manner of operation thereof, will become apparent from the following detailed description when taken in conjunction with the accompanying drawings.

DETAILED DESCRIPTION

Figure 1:
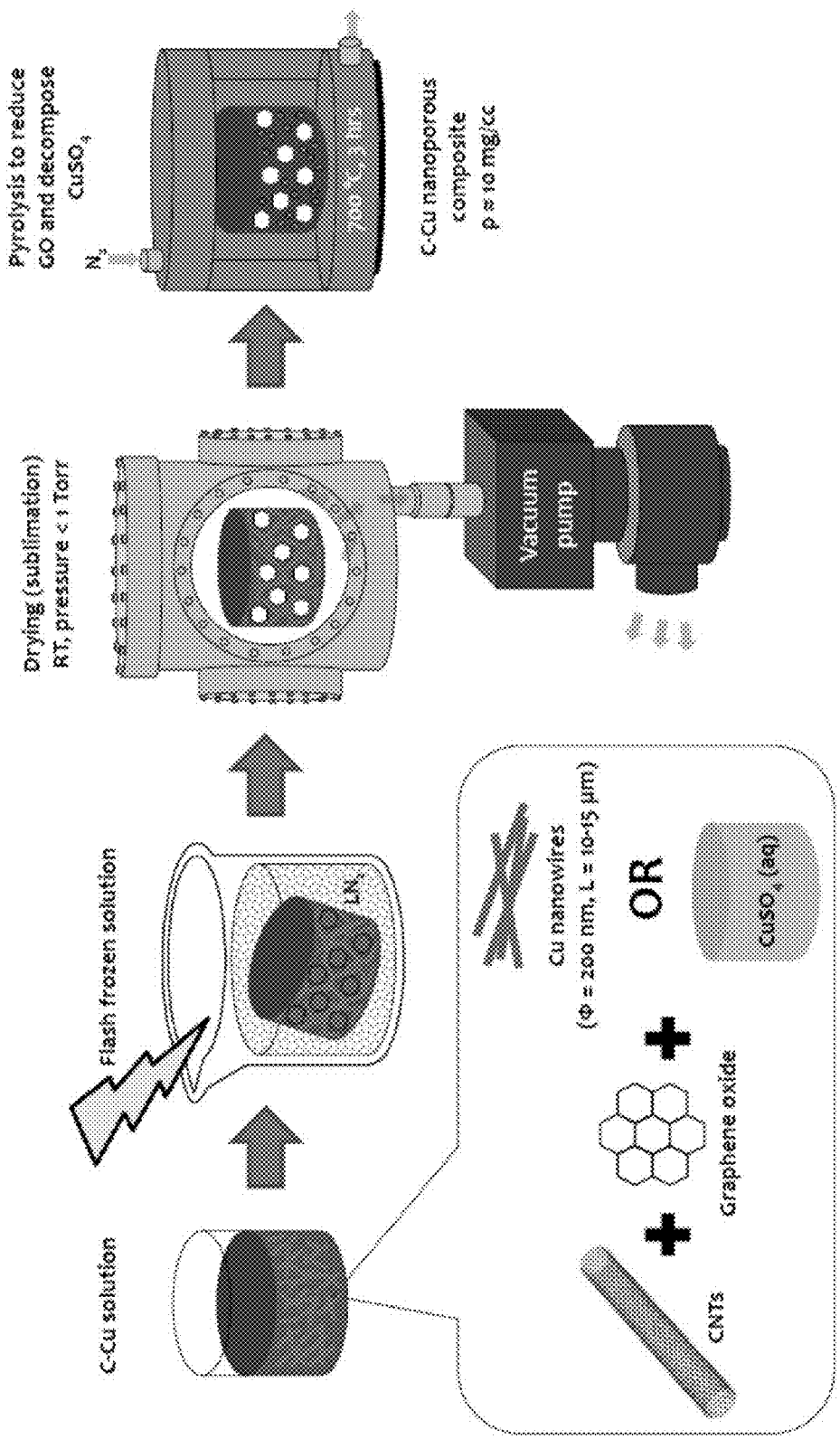
FIG. 1 shows example synthesis scheme of porous metal-carbon composites.

Method for Making Low-Density Nanoporous Metal-Carbon Composites

In some embodiments, the invention described herein relates to a method for making a low-density nanoporous metal-carbon composite, comprising (a) providing an aqueous mixture comprising (i) at least one of carbon nanotube and graphene oxide and (ii) at least one metal salt or metal nanowire; (b) freezing the mixture to obtain a cryo-composite; (c) drying the cryo-composite to obtain a dry composite; and (d) reducing the dry composite to obtain the metal-carbon composite.

The aqueous mixture can be an aqueous suspension of the metal salts and the carbon materials. The aqueous mixture can comprise, for example, carbon nanotubes, graphene oxide, or a combination thereof. The aqueous mixture can comprise, for example, about 0.1-40 mg/ml carbon nanotubes, about 0.1-40 mg/ml graphene oxide, a combination thereof.

The aqueous mixture can comprise, for example, one or more metal salts. The aqueous mixture can comprise, for example, two or more metal salts each comprising a different metal. The aqueous mixture can comprise, for example, a Cu salt such as $CuSO_4$. The aqueous mixture can comprise, for example, an Ag salt such as $AgNO_3$. The aqueous mixture can comprise, for example, an Au salt, a Pt salt, a Pd salt, a Ru salt, a Ni salt, or a Co salt. The aqueous mixture can comprise, for example, about 0.05-0.5 g/ml of metal salts.

The aqueous mixture can comprise, for example, one or more metal nanowires. The aqueous mixture can comprise, for example, two or more metal nanowires each comprising a different metal. The aqueous mixture can comprise, for example, Cu nanowires. The aqueous mixture can comprise, for example, Ag nanowires. The aqueous mixture can comprise, for example, nanowires of Au, Pt, Pd, Ru, Ni, or Co.

The aqueous mixture can be, for example, flash frozen in liquid nitrogen. The aqueous mixture can be, for example, slowly frozen in fridge. The cryo-composite can be, for example, placed in vacuum to remove the ice via sublimation.

The metal salts in the dry composite can be converted to pure metal by thermally or radiation-induced decomposition. The dry composite can be, for example, annealed/pyrolyzed in a reducing environment to yield the metal-carbon composite. The pyrolysis can take place at a temperature of, for example, about 500-900° C., or about 600-800° C., or about 700° C. The pyrolysis can take, for example, about 1-5 hours, or about 2-4 hours, or about 3 hours.

The metal-carbon composite obtained by the method described herein can be, for example, a low-density nanoporous metal-carbon composite. The low-density nanoporous metal-carbon composite can be, for example, a Cu—C composite or Ag—C composite. The low-density nanoporous metal-carbon composite can be, for example, an Au—C composite, a Pt—C composite, a Pd—C composite, a Ru—C composite, a Ni—C composite or a Co—C composite.

The low-density nanoporous metal-carbon composite can have a density of, for example, about 1 g/cm$^3$ or less, or about 150 mg/cm$^3$ or less, or about 100 mg/cm$^3$ or less, or about 50 mg/cm$^3$ or less, or about 40 mg/cm$^3$ or less, or about 30 mg/cm$^3$ or less, or about 20 mg/cm$^3$ or less, or about 1-50 mg/cm$^3$, or about 2-40 mg/cm$^3$, or about 5-30 mg/cm$^3$, or about 10-20 mg/cm$^3$.

The low-density nanoporous metal-carbon composite can have a metal loading of, for example, about 1 wt. % or more, about 5 wt. % or more, about 10 wt. % or more, or about 20 wt. % or more, or about 30 wt. % or more, or about 40 wt. % or more, or about 50 wt. % or more, or about 60 wt. % or more, or about 70 wt. % or more. In the low-density nanoporous metal-carbon composite, the atomic concentration of carbon and metal can be, for example, about 80 at. % or more, or about 90 at. % or more, or about 95 at. % or more, or about 98 at. % or more, or about 99 at. % or more.

The low-density nanoporous metal-carbon composite can be a monolith having a size of, for example, about 10$^3$ μm$^3$ or more, or about 10$^6$ μm$^3$ or more, or about 1 mm$^3$ or more, or about 1 cm$^3$ or more. The low-density nanoporous metal-carbon composite can have a thickness of, for example, about 10 μm or more, or about 100 μm or more, or about 1 mm or more, or about 1 cm or more, wherein metal nanoparticles are distributed throughout the thickness or internal part of the metal-carbon composite rather than only along its outside surface.

In some embodiments, the low-density nanoporous metal-carbon composites can be obtain by, for example, a process based on freeze drying of an aqueous suspension of carbon nanotubes (CNTs), graphene oxide (GO), or a combination of CNTs and GO, with metal salts, followed by thermally or radiation-induced decomposition of the metal salt and graphene oxide to pure metal (or metal oxide) and graphene, respectively. Metal nanowires (e.g., copper nanowires and silver nanowires) can also be used instead of or in addition to metal salts.

The material composition and density can be controlled by, for example, the choice of the metal salt and the fraction of the metal and carbon constituents. The pore size can be controlled by, for example, the choice of the rate of freezing. As described in Example 1, the production of low-density Cu—C and Ag—C composites have been experimentally demonstrated via thermal decomposition of Cu and Ag based salts in CNT and GO based matrices. The microstructure of the resultant foams and the size of Cu and Ag nanoparticles are illustrated in the SEM images of FIGS. 2 to 5. The method described herein allows for fabrication of ultralow density metal-carbon composites (e.g., ~10-20 mg/cm$^3$) with very large metal loading (e.g., >50 wt. %).

According to the method described herein, low-density nanoporous metal-carbon composites comprising nanoscale struts or pore walls can be realized, with tailor-ability of composition (the choice of the metal species), density, uniformity, and the overall dimension and shape of the monolith.

Method for Making Graphene-Supported Metal Aerogel

In some embodiments, the invention described herein relates to a method for making a graphene-supported metal aerogel, comprising (a) providing an aqueous mixture comprising (i) graphene oxide, (ii) at least one metal salt, and (iii) at least one catalyst; (b) curing the reaction mixture to produce a wet gel; (c) washing and drying the wet gel to obtain a metal-graphene oxide aerogel comprising a graphene oxide scaffold.

The aqueous mixture can be an aqueous suspension of the metal salts and the graphene oxide. The aqueous mixture can comprise, for example, about 0.1-40 mg/ml graphene oxide.

The aqueous mixture can comprise, for example, one or more metal salts. The aqueous mixture can comprise, for example, two or more metal salts each comprising a different metal. The aqueous mixture can comprise, for example, an Au salt such as gold chloride. The aqueous mixture can comprise, for example, an Cu salt, an Ag salt, a Pt salt, a Pd salt, a Ru salt, a Ni salt, or a Co salt. The aqueous mixture can comprise, for example, about 1-200 mg/ml of metal salts.

The aqueous mixture can comprise, for example, one or more catalyst. The catalyst can be, for example, ammonium hydroxide. The aqueous mixture can comprise, for example, about 10-500 μl/ml concentrated ammonium hydroxide.

The aqueous mixture can further comprise, for example, one or more reducing agent and/or capping agent. The reducing agent and/or capping agent can be, for example, sodium citrate. The aqueous mixture can comprise, for example, about 0.01-1 g/ml sodium citrate The reaction mixture can be cured at a temperature of about 100° C. or less, or about 25-100° C., or about 85° C., to produce the wet gel. The reaction mixture can be cured at atmospheric pressure.

The wet gel can be subjected to solvent exchange to remove reaction by-products. Suitable solvent include, but are not limited to, DI water. The wet gel can also be subjected to solvent exchange to remove water. Suitable solvents include, but are not limited to, acetone and ethanol.

Figure 8:
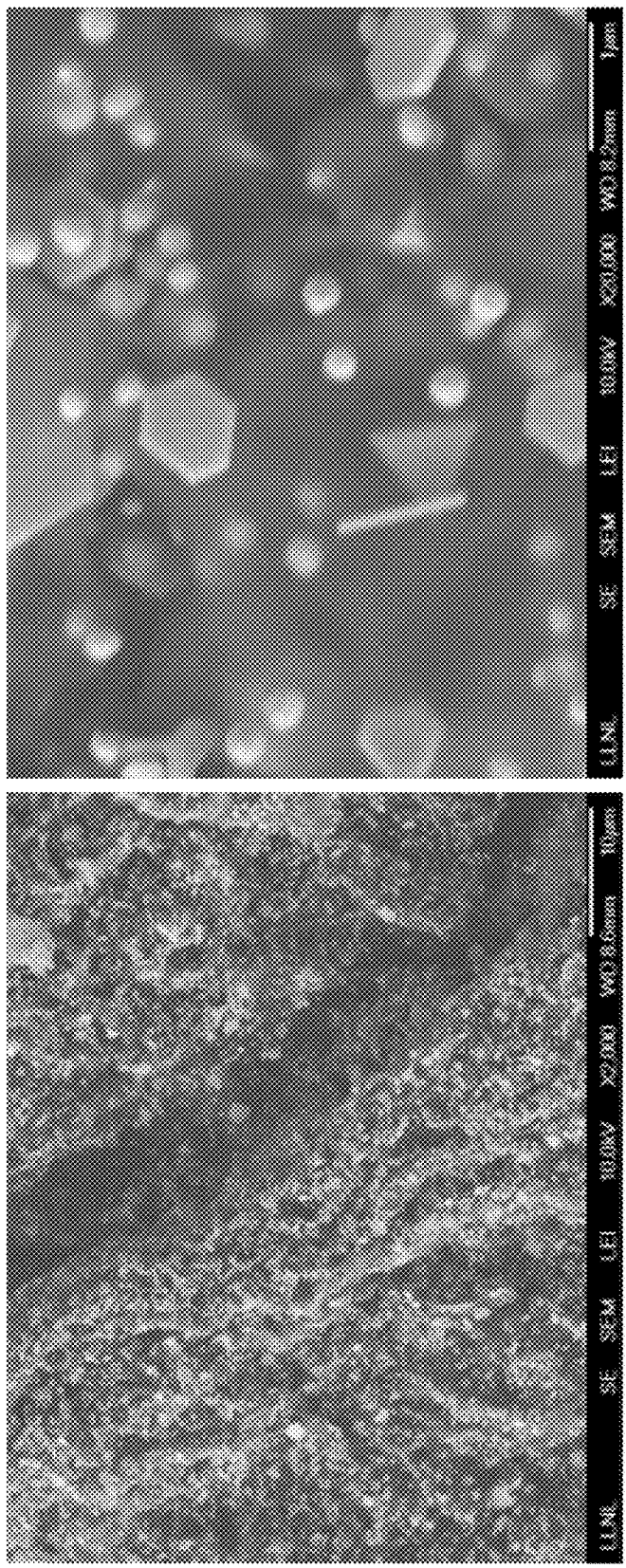
FIG. 8 shows example SEM images of gold particles decorating GO in Au/GO aerogel.
Figure 11:
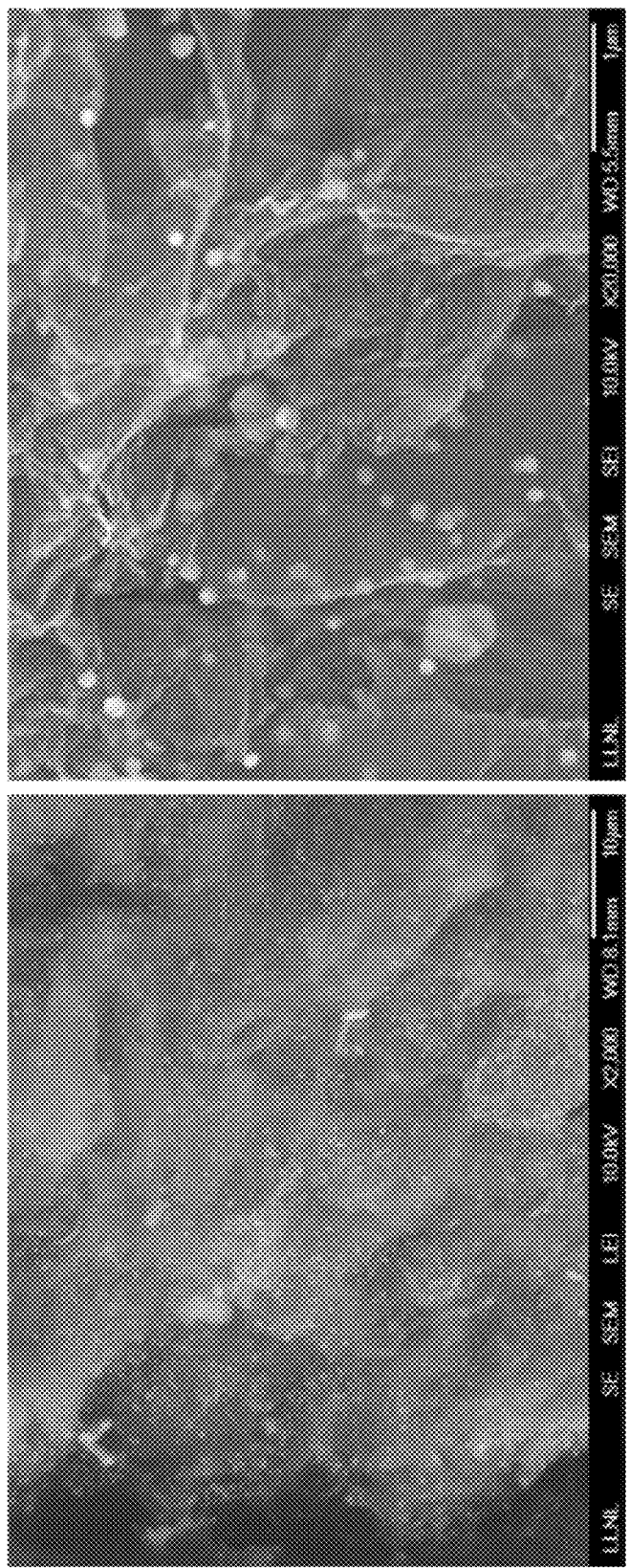
FIG. 11 shows example SEM images of Au/GO aerogel.

The wet gel can be dried in a supercritical gas to produce a dry gel. Suitable supercritical gases include, but are not limited to, supercritical $CO_2$. The wet gel can also be air-dried under ambient temperature and ambient pressure. The dry gel can be a metal-graphene oxide aerogel comprising a graphene oxide scaffold, as shown in FIGS. 8 and 11.

Figure 12:
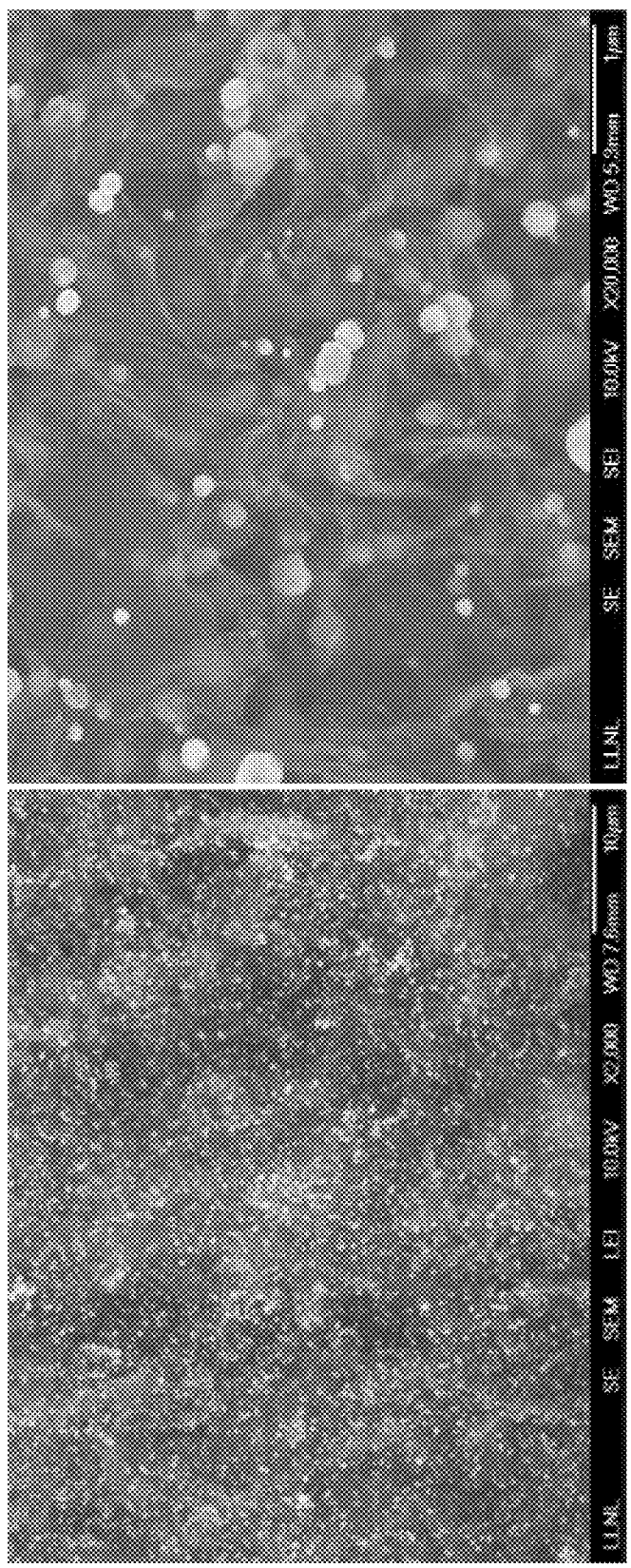
FIG. 12 shows example SEM images of Au/graphene aerogel.

The dry gel (metal-graphene oxide aerogel) can be, for example, thermally or chemically reduced to produce a metal-graphene aerogel comprising a graphene scaffold, as shown in FIG. 12. The dry gel can be reduced by, for example, annealing/pyrolysis in an inert gas at elevated temperature. Suitable inert gases include, but are not limited to, $N_2$. The dry gel can be annealed/pyrolyzed at, for example, about 600° C. or more, or about 800° C. or more, or about 1000° C. or more, or about 1050° C. The dry gel can be carbonized by the annealing/pyrolyzing step. The dry gel can be reduced by, for example, a reducing agent such as hydrazine.

Figure 9:
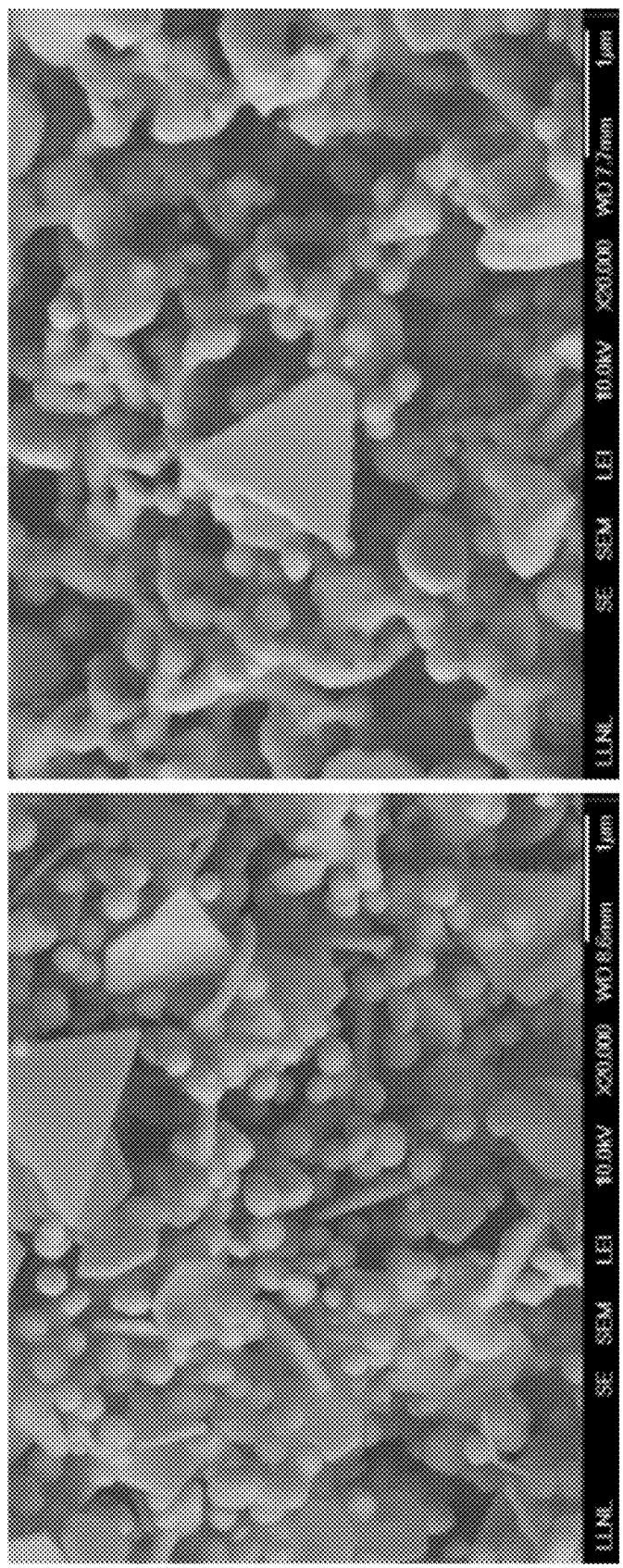
FIG. 9 shows example SEM images of Au aerogel after pyrolysis in air.
Figure 10:
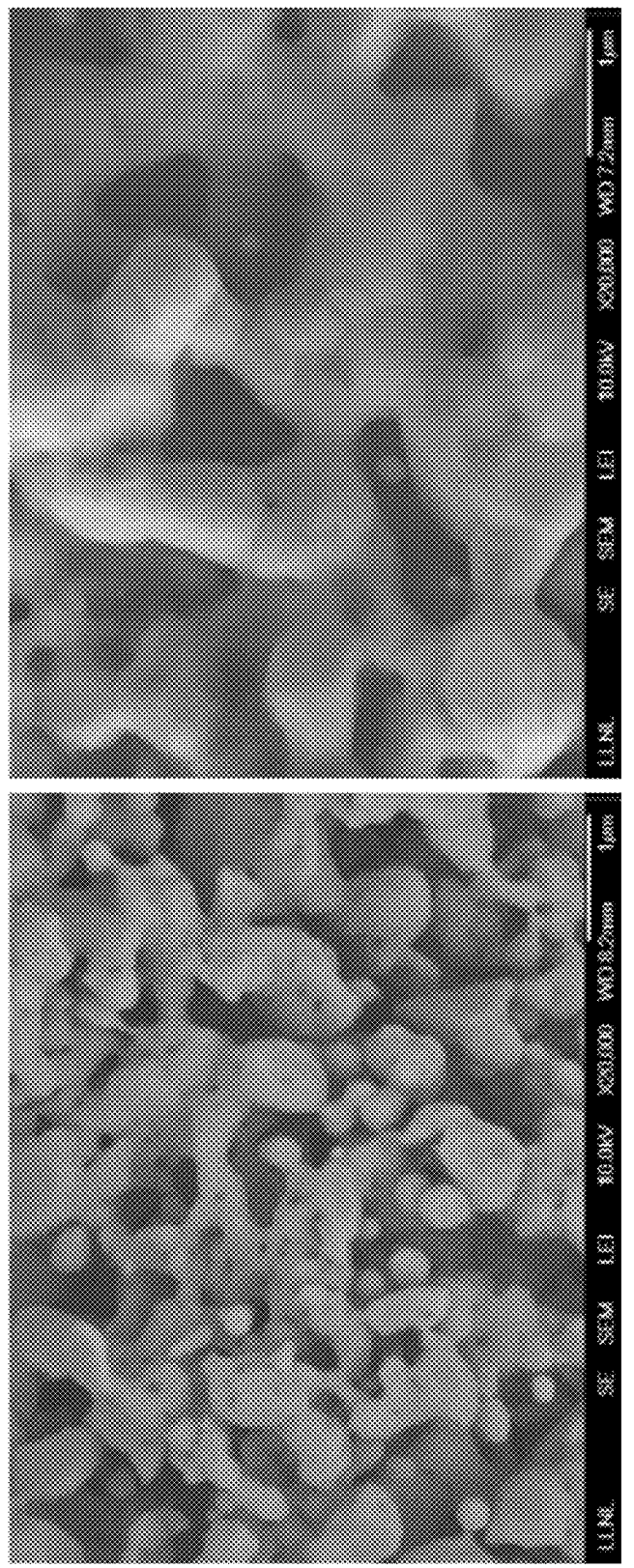
FIG. 10 shows example SEM images of Au aerogel after pyrolysis in air.

Alternatively, the dry gel (metal-graphene oxide aerogel) can be chemically etched or pyrolyzed in air to remove the graphene oxide component and to obtain a porous metal aerogel such as a porous gold aerogel, as shown in FIGS. 9 and 10. The temperature for pyrolysis can be, for example, about 400-700° C., or about 500° C., or about 600° C. The pyrolysis can take, for example, up to 2 hours, or up to 1 hour, or about 30 minutes.

Accordingly, the aerogel obtained by the method described herein can be, for example, a metal-graphene oxide aerogel (e.g., an Au-GO aerogel), a metal-graphene aerogel (e.g., an Au-graphene aerogel), or a metal aerogel (e.g., an Au aerogel).

The metal-graphene and the metal-graphene oxide aerogel can have a density of, for example, about 1 g/cm$^3$ or less, or about 100 mg/cm$^3$ or less, or about 80 mg/cm$^3$ or less, or about 70 mg/cm$^3$ or less, or about 60 mg/cm$^3$ or less, or about 50 mg/cm$^3$ or less, or about 20-100 mg/cm$^3$, or about 30-90 mg/cm$^3$, or about 40-80 mg/cm$^3$.

The metal-graphene aerogel and the metal-graphene oxide aerogel can have a metal loading of, for example, about 1 wt. % or more, or about 5 wt. % or more, or about 10 wt. % or more, or about 20 wt. % or more, or about 30 wt. % or more, or about 40 wt. % or more, or about 40-50 wt. %. In the metal-graphene aerogel, the atomic concentration of carbon and metal can be, for example, about 80 at. % or more, or about 90 at. % or more, or about 95 at. % or more, or about 98 at. % or more, or about 99 at. % or more.

The metal aerogel can have a density of, for example, about 1 g/cm$^3$ or less, or about 150 mg/cm$^3$ or less, or about 120 mg/cm$^3$ or less, or about 100 mg/cm$^3$ or less, or about 80 mg/cm$^3$ or less, or about 60 mg/cm$^3$ or less, or about 20-150 mg/cm$^3$, or about 30-120 mg/cm$^3$, or about 40-100 mg/cm$^3$. In the metal aerogel, the atomic concentration of metal can be, for example, about 80 at. % or more, or about 90 at. % or more, or about 95 at. % or more, or about 98 at. % or more, or about 99 at. % or more.

The metal-graphene oxide aerogels, metal-graphene aerogels, and metal aerogels described herein can be a monolith having a size of, for example, about 10$^3$ μm$^3$ or more, or about 10$^6$ μm$^3$ or more, or about 1 mm$^3$ or more, or about 1 cm$^3$ or more. They can have a thickness of, for example, about 10 μm or more, or about 100 μm or more, or about 1 mm or more, or about 1 cm or more, wherein metal nanoparticles are distributed throughout the thickness or internal part of the aerogel rather than only along its outside surface.

In some embodiments, the metal-graphene aerogel or metal-graphene oxide aerogel can be synthesized as follows: First, graphene oxide is added to water and sonicated (e.g. for ~24 hours) to make a stable suspension. Next a metal salt (e.g., gold chloride) is dissolved in the GO suspension, followed by sodium citrate. Lastly, ammonium hydroxide is added. The suspension is then heated to 85° C. until a stable gel is formed. The gel is then washed in water to remove reaction byproducts, then acetone or ethanol. Depending on the strength of the gel, drying can be done under ambient or supercritical conditions to yield a metal-GO aerogel (e.g., an Au-GO aerogel). To produce a metal-graphene aerogel (e.g., an Au-graphene aerogel), the metal-GO aerogel is treated to chemical or thermal reduction (e.g. hydrazine, carbonization at 1050° C.). Optionally, the GO scaffold in the metal-GO aerogel can be removed (e.g. pyrolyzed in air at 500° C.) to produce a metal aerogel (e.g., an Au aerogel).

As described in Example 2, the production of low-density Au-graphene and Au aerogels have been experimentally demonstrated. The gels can be formed by reducing Au salt dissolved in a graphene oxide (GO) suspension. The Au particles nucleate and grow on the GO sheets which are subsequently cross-linked to each other to create an Au-coated GO gel. After drying, the aerogel can be carbonized to yield a Au-graphene aerogel or the GO can be removed (e.g. via pyrolysis in air) to produce an Au aerogel. This method is also applicable to other metals, such as Cu, Ag, Au, Pt, Pd, Ru, Ni, and Co.

Nanoparticle-Trapping Method for Making Metal-Carbon Composites

In some embodiments, the invention described herein relates to a "nanoparticle-trapping" method for making a metal-carbon composite, comprising (a) providing an aqueous mixture comprising (i) carbon nanotubes, (ii) at least one metal nanoparticles, and optionally (iii) at least one surfactant of the metal nanoparticles; (b) curing the reaction mixture to produce a wet gel; (c) washing and drying the wet gel to obtain a carbon nanotube-metal nanoparticle composite.

The aqueous mixture can comprise, for example, one or more metal nanoparticles. The aqueous mixture can comprise, for example, two or more metal nanoparticles each comprising a different metal. The aqueous mixture can comprise, for example, Cu nanoparticles. The aqueous mixture can comprise, for example, Ag nanoparticles, Au nanoparticles, Pt nanoparticles, Pd nanoparticles, Ru nanoparticles, a Ni nanoparticles, or Co nanoparticles. The aqueous mixture can comprise, for example, about 30-70 vol. % of metal nanoparticles, or about 40-60 vol. % of metal nanoparticles, or about 50 vol. % of metal nanoparticles.

The aqueous mixture can comprise, for example, one or more surfactant for the nanoparticles, such as polyacrylic acid. The aqueous mixture can further comprise one or more sol-gel precursors, such as resorcinol (R) and formaldehyde (F), and one or more polymerization catalysts, such as $Na_2CO_3$.

The reaction mixture can be cured at a temperature of about 100° C. or less, or about 25-100° C., or about 85° C., to produce the wet gel. The reaction mixture can be cured at atmospheric pressure.

The wet gel can be, for example, subjected to solvent exchange to remove reaction by-products. Suitable solvent include, but are not limited to, DI water. The wet gel can also be subjected to solvent exchange to remove water. Suitable solvents include, but are not limited to, acetone and ethanol.

The wet gel can be dried in a supercritical gas to produce a dry gel. Suitable supercritical gases include, but are not limited to, supercritical $CO_2$. The wet gel can also be air-dried under ambient temperature and ambient pressure. The dry gel can be a metal-CNT composite with polymeric binder.

The dry gel can be, for example, thermally or chemically reduced to produce a metal-carbon composite, as shown in FIG. 17(a)-(b). The dry gel can be reduced by, for example, annealing/pyrolysis in an inert gas at elevated temperature. Suitable inert gases include, but are not limited to, $N_2$. The dry gel can be annealed/pyrolyzed at, for example, about 600° C. or more, or about 800° C. or more, or about 1000° C. or more, or about 1050° C. The dry gel can be carbonized by the annealing/pyrolyzing step. The dry gel can be reduced by, for example, a reducing agent such as hydrazine.

Accordingly, the composite obtained by the method described herein can be, for example, a metal-carbon composite (e.g., a Cu—C composite) or a metal-CNT composite with polymeric binder (e.g., a Cu-CNT composite).

The metal-carbon composite can have a density of, for example, about 1 g/cm$^3$ or less, or about 150 mg/cm$^3$ or less, or about 120 mg/cm$^3$ or less, or about 100 mg/cm$^3$ or less, or about 80 mg/cm$^3$ or less, or about 60 mg/cm$^3$ or less, or about 20-150 mg/cm$^3$, or about 30-120 mg/cm$^3$, or about 40-100 mg/cm$^3$.

The metal-carbon composite can have a metal loading of, for example, about 1 wt. % or more, or about 5 wt. % or more, or about 10 wt. % or more, or about 20 wt. % or more, or about 30 wt. % or more, or about 40 wt. % or more, or about 50 wt. % or more, or about 60 wt. % or more, or about 70 wt. % or more. In the metal-carbon composite, the atomic concentration of carbon and metal can be, for example, about 80 at. % or more, or about 90 at. % or more, or about 95 at. % or more, or about 98 at. % or more, or about 99 at. % or more.

The metal-carbon composite described herein can be a monolith having a size of, for example, about 10$^3$ μm$^3$ or more, or about 10$^6$ μm$^3$ or more, or about 1 mm$^3$ or more, or about 1 cm$^3$ or more. They can have a thickness of, for example, about 10 μm or more, or about 100 μm or more, or about 1 mm or more, or about 1 cm or more, wherein metal nanoparticles are distributed throughout the thickness or internal part of the metal-carbon composite rather than only along its outside surface.

Salt-Impregnation Method for Making Metal-Carbon Composites

In some embodiments, the invention described herein relates to a "salt-impregnation" method for making a metal-carbon composite, comprising (a) providing a carbon aerogel; (b) immersing said carbon aerogel in an aqueous solution comprising at least one metal salt; (c) freeze drying the carbon aerogel in a vacuum to obtain a metal salt-impregnated carbon aerogel; and (d) reducing or decomposing the metal salt-impregnated carbon aerogel to obtain the metal-carbon composite.

The carbon aerogel can be a monolithic graphene aerogel. Alternatively, the carbon aerogel can be a monolithic CNT-carbon aerogel, which can comprise a CNT loading of, for example, at least about 20 wt. %, or at least about 30 wt. %, or at least about 40 wt. %, or at least about 50 wt. %, or about 55 wt. %.

The aqueous solution can be, for example, one or more metal salts. The aqueous solution can comprise, for example, two or more metal salts each comprising a different metal. The aqueous solution can comprise, for example, a Cu salt such as CuSO$_4$. The aqueous solution can comprise, for example, an Pt salt such as chloroplatinic acid. The aqueous solution can comprise, for example, an Ag salt, an Au salt, a Pd salt, a Ru salt, a Ni salt, a Co salt, a Mo salt, a W salt, a Fe salt, a Si salt, a Ta salt, a salt of rare-earth metals, and a salt of other transition metals. The aqueous solution can comprise, for example, about 0.05-0.5 g/ml of metal salts.

The carbon aerogel can then be, for example, freeze dried in a vacuum to obtain metal salt-impregnated carbon aerogel. The freeze drying can ensure, for example, even distribution of the metal salt throughout the entire carbon aerogel.

The metal salts in the metal salt-impregnated carbon aerogel can be converted to pure metal by reduction or decomposition. The metal salts can be, for example, decomposed by heating under nitrogen gas. The metal salts can be, for example, reduced by heating under hydrogen gas. The reduction or decomposition of the metal salts can take place at a temperature of, for example, about 400-500° C., or about 500-600° C., or about 600-700° C., or about 700-800° C. The reduction or decomposition of the metal salts can take, for example, about 1-5 hours, or about 2-4 hours, or about 3 hours.

The nanoporous metal-carbon composite obtained by the method described herein can be, for example, a high metal-loading nanoporous metal-carbon composite. The high metal-loading nanoporous metal-carbon composite can be, for example, a Cu—C composite or Pt—C composite. The nanoporous metal-carbon composite can be, for example, an Au—C composite, a Ag—C composite, a Pd—C composite, a Ru—C composite, a Ni—C composite, a Co—C composite, a Mo—C composite, a W—C composite, a Fe—C composite, a Si—C composite, or a Ta—C composite.

The nanoporous metal-carbon composite can have a density of, for example, about 1 g/cm$^3$ or less, or about 150 mg/cm$^3$ or less, or about 100 mg/cm$^3$ or less, or about 90 mg/cm$^3$ or less, or about 80 mg/cm$^3$ or less, or about 70 mg/cm$^3$ or less, or about 60 mg/cm$^3$ or less, or about 50 mg/cm$^3$ or less, or about 30-150 mg/cm$^3$, or about 40-100 mg/cm$^3$.

The nanoporous metal-carbon composite can have a metal loading of, for example, about 1 wt. % or more, or about 5 wt. % or more, about 10 wt. % or more, or about 20 wt. % or more, or about 30 wt. % or more, or about 40 wt. % or more, or about 50 wt. % or more, or about 60 wt. % or more, or about 70 wt. % or more. In the nanoporous metal-carbon composite, the atomic concentration of carbon and metal can be, for example, about 80 at. % or more, or about 90 at. % or more, or about 95 at. % or more, or about 98 at. % or more, or about 99 at. % or more.

The nanoporous metal-carbon composite can be a monolith having a size of, for example, about 10$^3$ μm$^3$ or more, or about 10$^6$ μm$^3$ or more, or about 1 mm$^3$ or more, or about 1 cm$^3$ or more. The nanoporous metal-carbon composite can have a thickness of, for example, about 10 μm or more, or about 100 μm or more, or about 1 mm or more, or about 1 cm or more, wherein metal nanoparticles are distributed throughout the thickness or internal part of the metal-carbon composite rather than only along its outside surface.

In some embodiments, the nanoporous metal-carbon composite is a graphene aerogel impregnated with platinum nanoparticles. In some embodiments, the nanoporous metal-carbon composite is a CNT-carbon aerogel impregnated with copper nanoparticles. These aerogels integrate the high surface area and electrical conductivity of 3D graphene and CNT-CA monoliths with the functional properties of molybdenum, platinum, palladium, tungsten, nickel cobalt, iron, copper, silver, gold, silicon, tantalum, rare-earths, and other transition metals.

These and other features, together with the organization and manner of operation thereof, will become apparent from the following detailed description when taken in conjunction with the accompanying drawings.

WORKING EXAMPLES

Example 1

Low-Density Porous Copper-Carbon and Silver-Carbon Composites

In a typical synthesis, carbon nanotubes (CNT) (0.1-40 mg/ml), GO (0.1-40 mg/ml), and CuSO$_4$ (0.05-0.5 g/ml) were added to water. The suspension was flash frozen and then placed in vacuum to remove the ice via sublimation.

Finally the cryogel was annealed in a reducing environment to yield the Cu-carbon composite. Other metal salts (e.g. AgNO$_3$) was also used. An example synthesis scheme is shown in FIG. 1.

Figure 2:
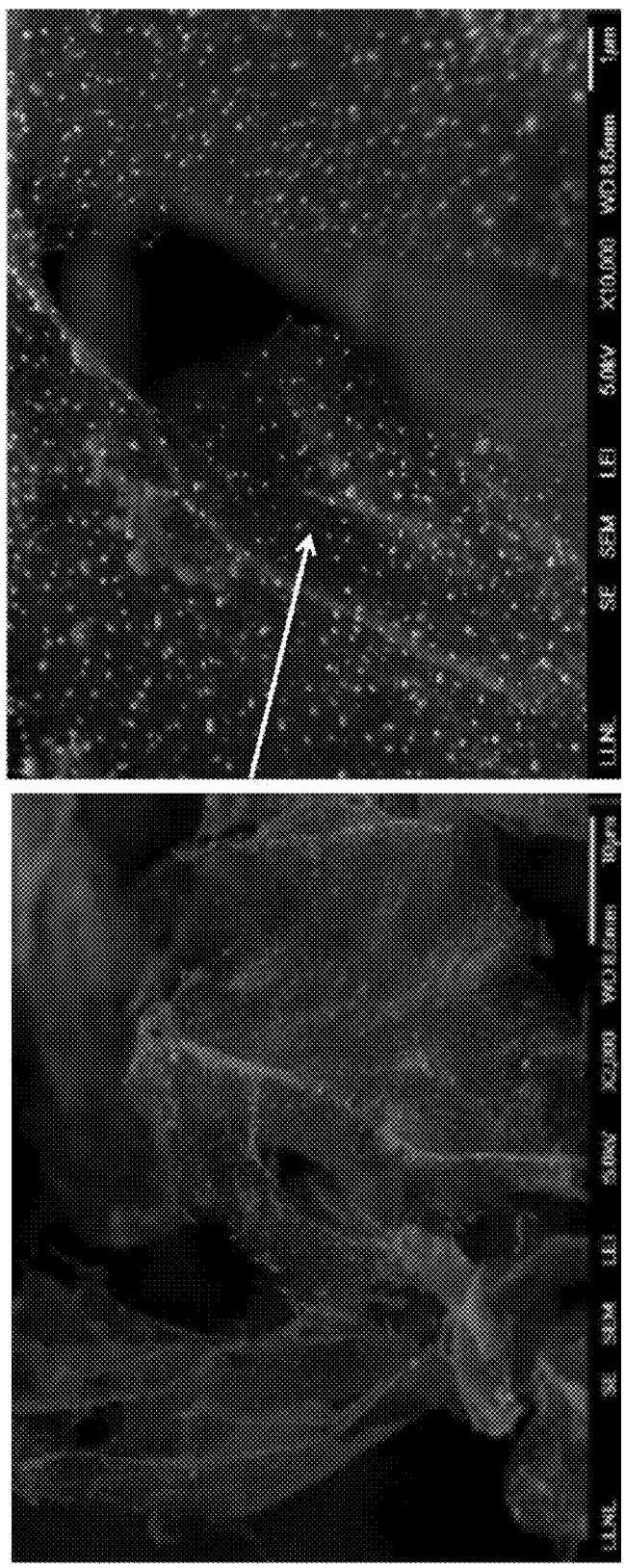
FIG. 2 shows example SEM images of Cu/CNT composite. Arrow points to CNT network.

FIG. 2 shows a 14 mg/cc Cu/CNT composite—JCSCP013. JCSCP013 was obtained according to the following protocol: (1) 0.5 g CNT+0.125 g CuSO4 [1:60]; (2) fast freeze in LN2; and (3) pyrolysis at 700° C. for 3 hours. As indicated by the arrow, JCSCP013 comprises a CNT network.

Figure 3:
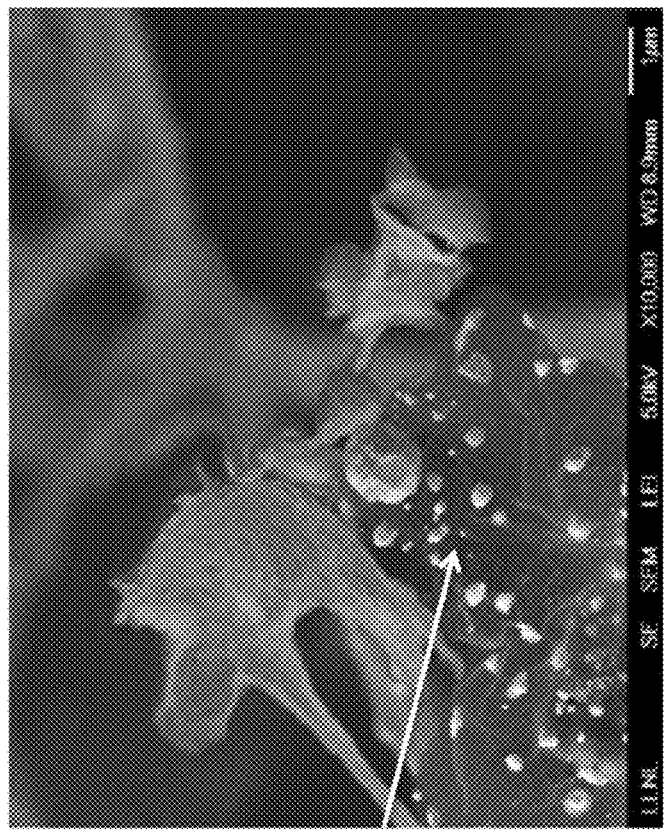
FIG. 3 shows example SEM images of Cu/CNT/graphene composite. Arrow points to CNT/GO network.
Figure 3:
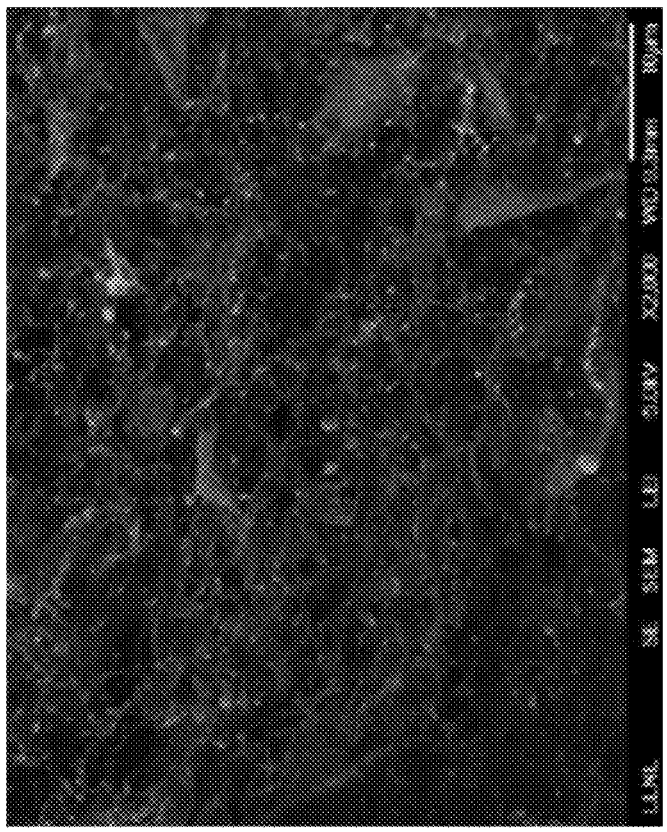

FIG. 3 shows two 10 mg/cc Cu/CNT/graphene composites—JCSCP016 and JCSCP017. JCSCP016 and JCSCP017 were obtained according to the following protocol: (1) 0.25 g CNT+0.25 g SLGO+0.125 g CuSO4 [1:60]; (2) fast freeze in LN2; and (3) pyrolysis at 700° C. for 3 hours. As indicated by the arrow, JCSCP017 comprises a CNT/GO network.

Figure 4:
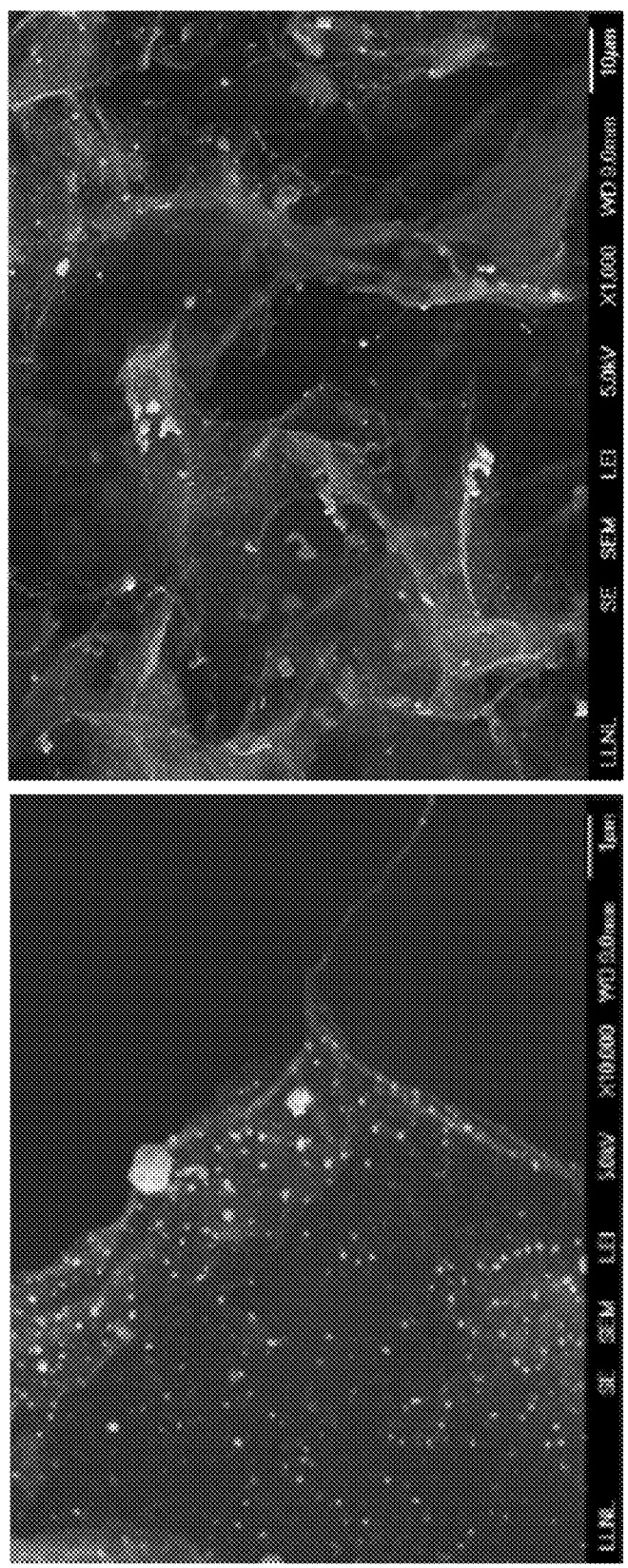
FIG. 4 shows example SEM images of Ag/CNT composite.

FIG. 4 shows a 15 mg/cc Ag/CNT composite—JCSCP019. JCSCP019 was based on silver instead of copper, and was obtained according to the following protocol: (1) 0.5 g CNT+0.05 g AgNO3 [1:30]; (2) slow freeze in a fridge; and (3) pyrolysis at 700° C. for 3 hours.

Figure 5:
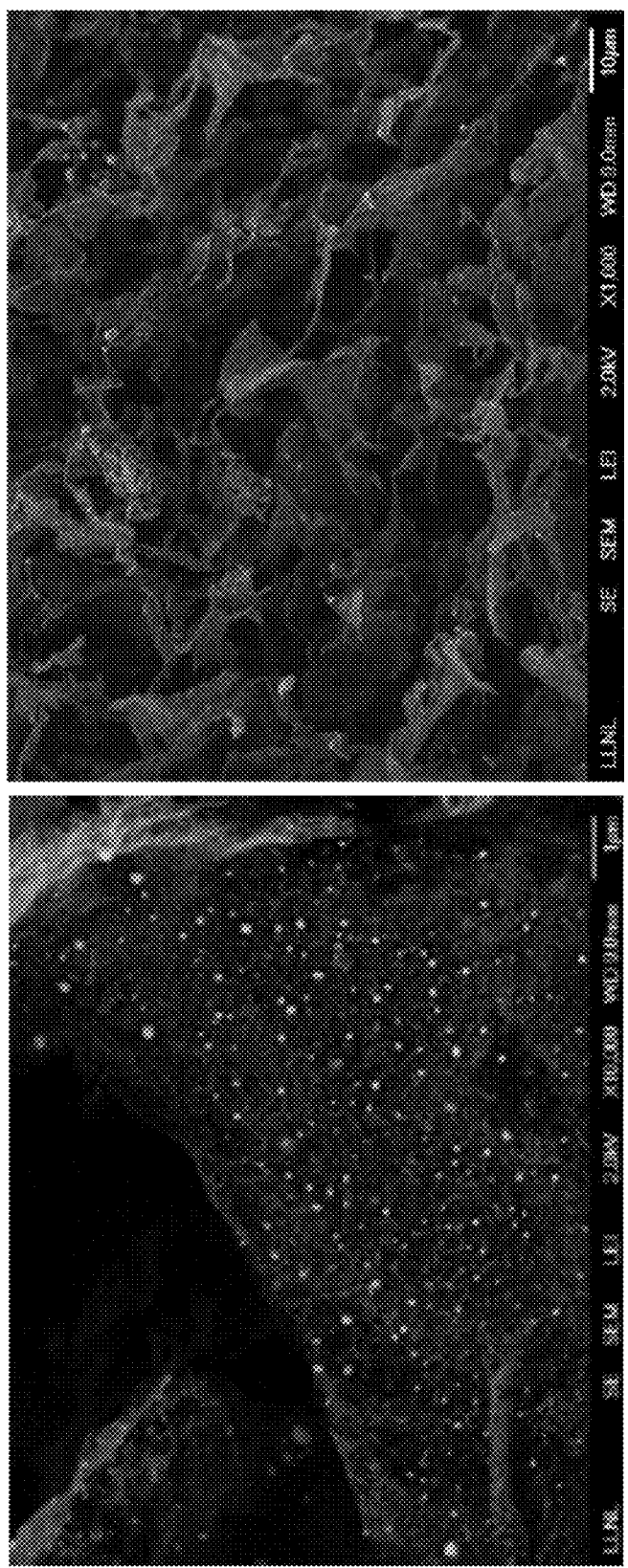
FIG. 5 shows example SEM images of Cu/CNT/graphene composite.

FIG. 5 shows a 11 mg/cc Cu/CNT/graphene composite—JCSCP029. JCSCP029 was obtained according to the following protocol: (1) 0.5 g CNT+0.5 g SLGO+0.25 g CuSO4 [1:20]; (2) fast freeze with LN2; (3) pyrolysis at 700° C. for 3 hours.

Figure 6:
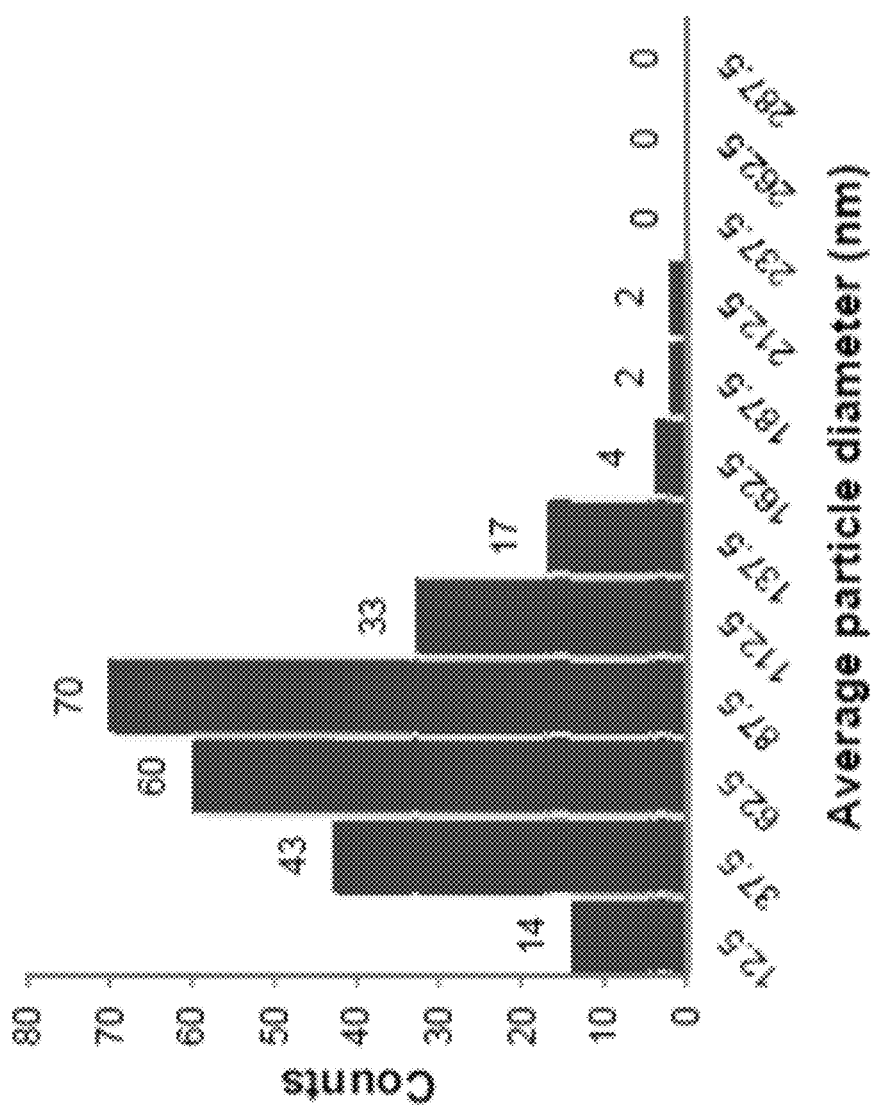
FIG. 6 shows example plot of Cu particle size distribution of the Cu/CNT/graphene composite of FIG. 5.

FIG. 6 shows example plot of Cu particle size distribution of JCSCP029.

Example 2

Graphene-Supported Gold Aerogel

In a typical synthesis, graphene oxide (GO) (0.1-40 mg/ml) is added to water and sonicated for 24 hours to make a stable suspension. Next gold chloride (1-200 mg/ml) is dissolved in the GO suspension, followed by sodium citrate (0.01-1 g/ml). Lastly, concentrated ammonium hydroxide (10-500 ml/ml) is added. The suspension is then heated to 85° C. in a sealed vessel until a stable gel is formed. The gel is then washed in water to remove reaction byproducts, then acetone or ethanol. Depending on the strength of the gel, drying can be done under ambient or supercritical conditions to yield a Au/GO aerogel. To produce the Au/graphene aerogel, the Au/GO aerogel is treated to chemical or thermal reduction (e.g. hydrazine, carbonization at 1050° C.). To produce the Au aerogel, the GO scaffold in the Au/GO aerogel is removed (e.g. chemically etched or pyrolyzed in air at 500° C.).

Figure 7:
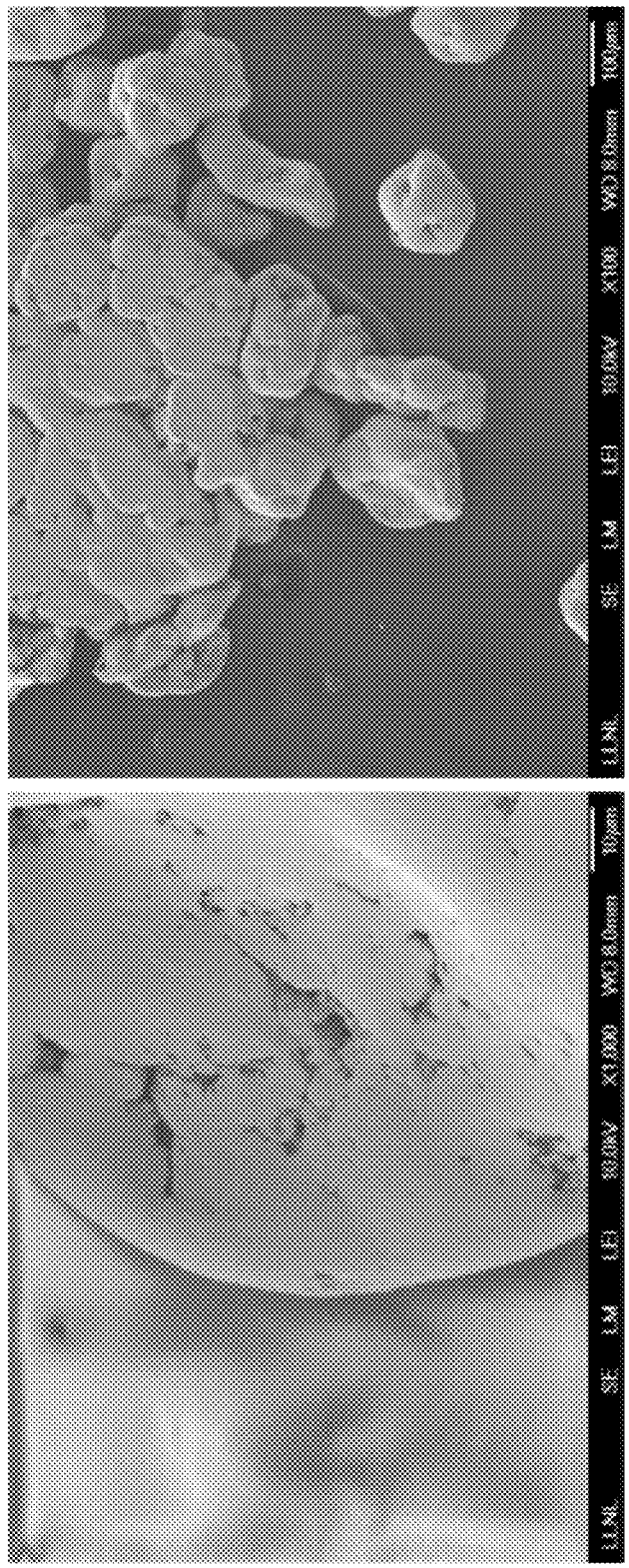
FIG. 7 shows example SEM images of gold agglomerates formed when GO is not present.

FIG. 7 shows the formation of gold agglomerates when GO is not present, which was obtained according to the following protocols: (1) 0.5 g/cc sodium citrate+128 mg/cc gold chloride+3 g water; (2) washed in water, EtOH, and air-dried.

FIG. 8 shows an Au/GO aerogel (8-12 at % Au) comprising gold particles decorating GO, which was obtained according to the following protocols: (1) 10 mg/cc GO+0.5 g/cc sodium citrate+128 mg/cc gold chloride+3 g water; (2) washed in water, EtOH, and air-dried.

FIG. 9 shows Au aerogels after pyrolysis in air at 500° C. and 600° C. (A) ramp to 500° C., no hold; (B) ramp to 600° C., no hold. FIG. 10 shows Au aerogels after pyrolysis in air at 600° C. (A) ramp to 600° C., 15 min hold; (B) ramp to 600° C., 40 min hold.

FIG. 11 shows another Au/GO aerogel (70 mg/cc, ~5 at % Au by RBS), which was obtained according to the following protocols: (1) 10 mg/cc GO+0.01 g/cc sodium citrate+16 mg/cc gold chloride+3 g water; (2) washed in water, acetone, and supercritical-dried.

FIG. 12 shows another Au/graphene aerogel (10-15 at % Au by EDX), which was obtained according to the following protocols: (1) 10 mg/cc GO+0.01 g/cc sodium citrate+16 mg/cc gold chloride+3 g water; (2) washed in water, acetone, and supercritical-dried; (3) pyrolysis at 1050° C. N$_2$ for 3 hours).

Example 3

Pt Nanoparticle-Loaded Graphene Aerogel

Graphene aerogel is prepared using a precursor of graphene oxide that is prepared with Hummer's method. Organic sol-gel chemistry is used to cross-link the sheets and after supercritical drying, carbonization is achieved though pyrolysis at 1050° C. under nitrogen. See Worsley et al., *J. Am. Chem. Soc.* 132:14067-14069 (2010). To decorate with Pt nanoparticles, the graphene aerogels are submerged in an aqueous solution of chloroplatinic acid. The aerogels are then freeze dried to ensure even distribution of the platinum salt. Finally, the platinum salts are reduced to platinum metal by heating under hydrogen gas at 450° C.

The loading and size of the Pt nanoparticles deposited on the graphene aerogel is confirmed with transmission electron microscopy (TEM, JEOL 2010) and scanning electron microscopy (SEM, FEI Sirion XL30). Energy dispersive x-ray spectroscopy (EDAX) is used for elemental analysis.

Figure 13:
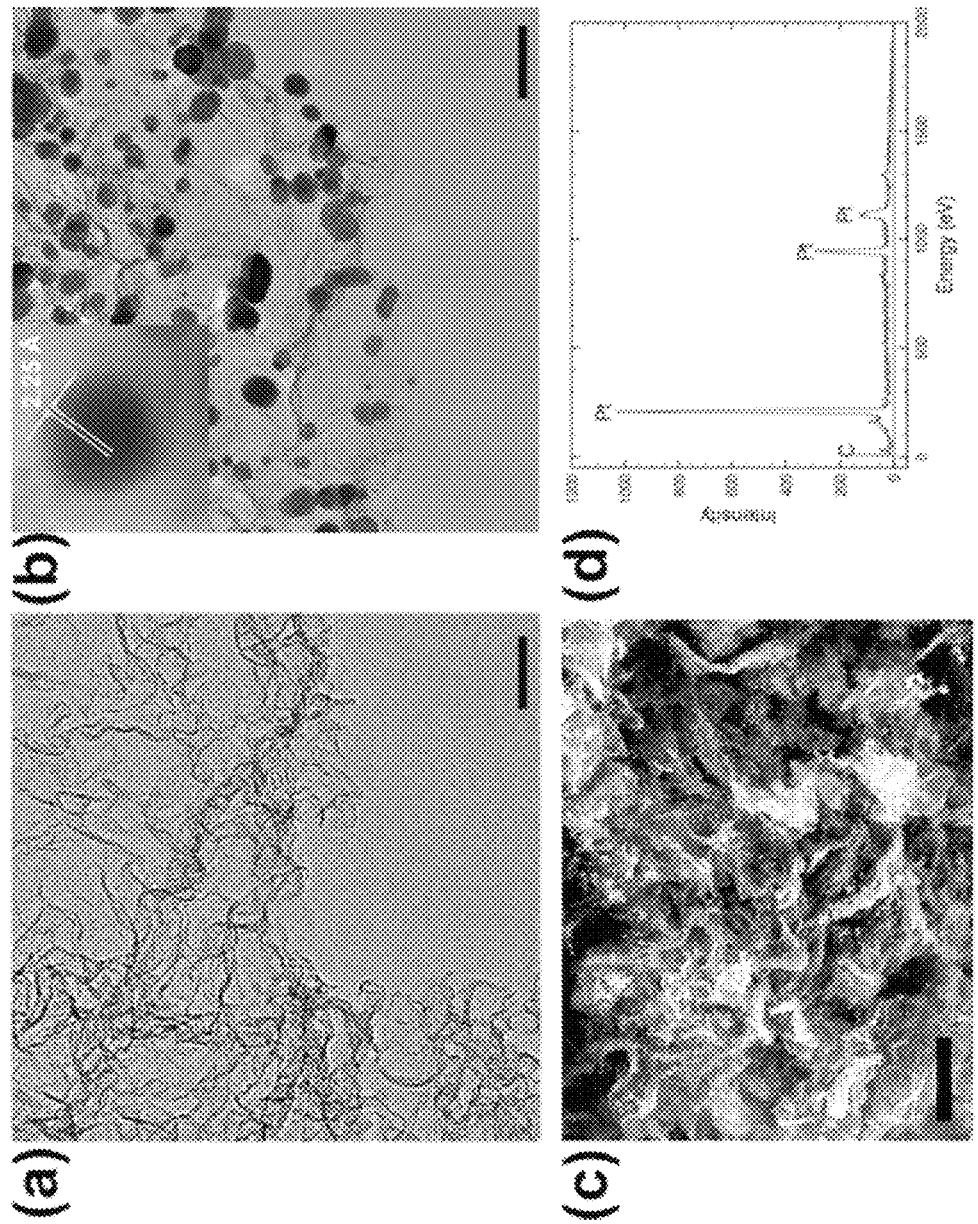
FIG. 13 shows: (a) Example TEM image of graphene aerogel prior to loading with platinum nanoparticles. (b) Example TEM image of Pt nanoparticles dispersed on the graphene aerogel. Dark nanoparticles are supported on the lower-contrast nanoporous graphitic structure. (b, inset) TEM showing Pt (111) spacing of 2.25 Å. (c) Example SEM shows Pt loading over a large area, including some larger clusters. (d) Example EDAX spectra confirming carbon and platinum are the only elements present. Scale bars: (a,b) 20 nm; (c) 5 μm.

As shown in FIG. 13-*a*, graphene aerogel provided a high surface area (>1000 m2/g) onto which metal nanoparticles were deposited. Platinum nanoparticles embedded into the graphene aerogel provided a highly catalytically active material, which can transfer heat with minimal additional mass and is stable at elevated temperatures.

FIG. 13-*b* shows a TEM image of graphene aerogel that has been loaded with platinum nanoparticles. The average nanoparticle size is 6.3 nm+/−3.3 nm, as determined by analysis of several TEM images, The nanoparticles are crystalline, as shown in the inset of FIG. 13-*b*, and display a lattice spacing of 2.25 Å, consistent with the platinum (111) crystal planes. FIG. 13-*c* shows an SEM image of the Pt NP-loaded graphene aerogel confirming a uniform loading of platinum nanoparticles throughout the material. Energy dispersive x-ray spectroscopy confirms that only carbon and Pt are present, as shown in FIG. 13-*d*.

Example 4

Nanoporous Cu—C Composites Based on Carbon-Nanotube Aerogel

Figure 14:
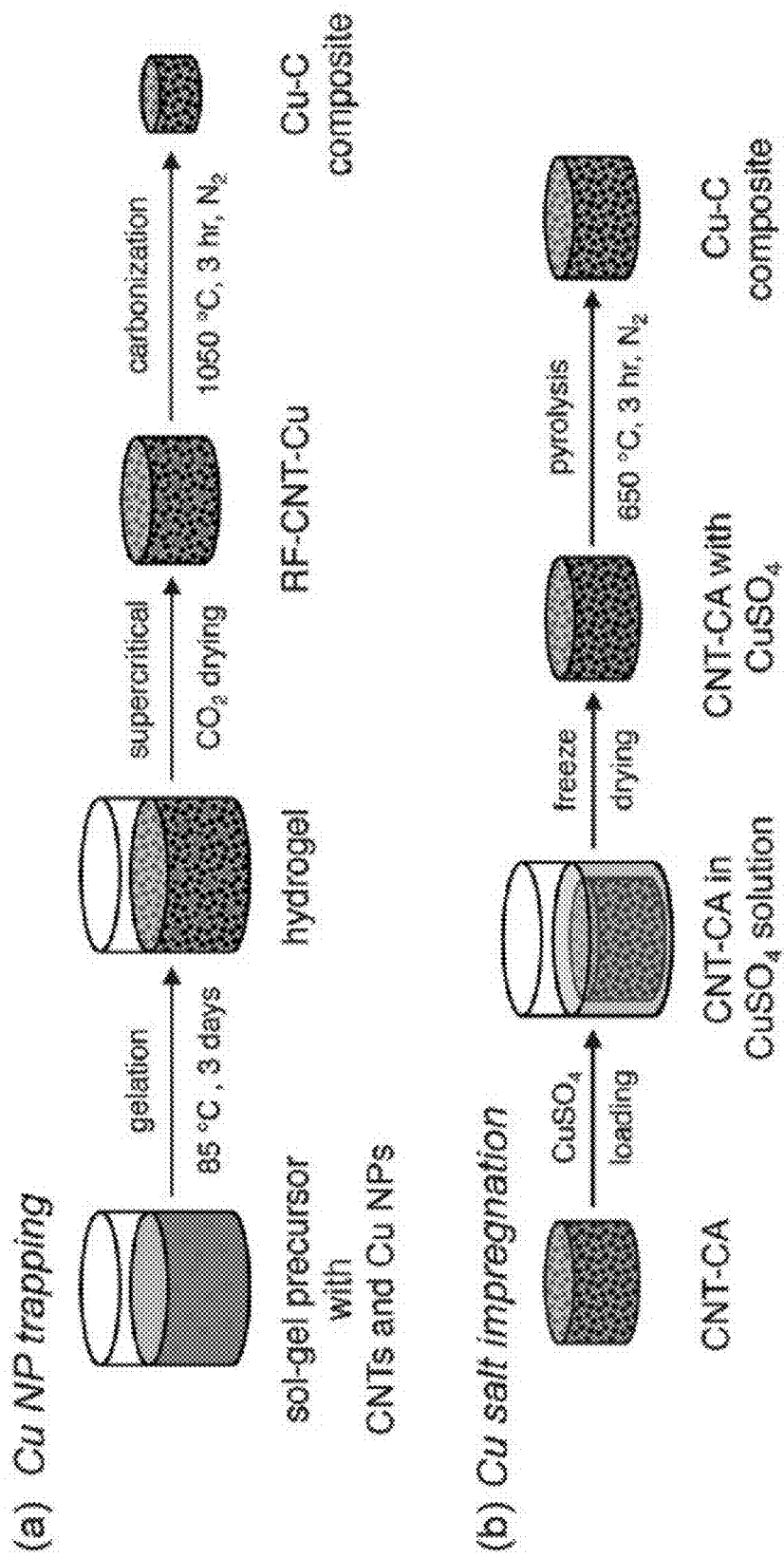
FIG. 14 shows example schematic of the fabrication of Cu—C composites by (a) the trapping of Cu NPs during the gelation of CNT-CAs and (b) the impregnation of initially undoped CNT-CA monoliths with an aqueous $CuSO_4$ solution followed by freeze drying and thermal decomposition of the salt.

The two methods of the preparation of Cu—C composites are schematically illustrated in FIG. 14. These methods are referred to below as NP trapping and salt impregnation. Both methods are based on using CNT-CAs as scaffolds, whose synthesis and characterization have been described elsewhere.

Nanoparticle trapping method. The NP trapping method begins with the preparation of two separate aqueous suspensions of CNTs and Cu NPs. We used commercial purified single-walled CNTs (Carbon Solutions, Inc.) and Cu NPs (QuantumSphere, Inc.) with diameters in the range of 10-70 nm with the polyacrylic acid (PAA) as the surfactant. Both CNTs and Cu NPs were dispersed by sonication in a VWR Scientific Aquaic Sonicator (Model 75T) and vortex mixing. Aggregates of NPs were removed by centrifuging (at 5000 rpm for ~5 minutes), and the desired Cu concentration in the suspension was tuned by water evaporation at ~60° C. The two suspensions of CNTs and Cu NPs were mixed, and sol-gel precursors [resorcinol (R) and formaldehyde (F)] and the polymerization catalyst (Na2CO3) were added. The mixture gel-led on curing in an oven at 85° C. for 3 days. Following gelation, wet gels were washed with acetone at room temperature for at least 2 days before supercritical CO2 drying, yielding Cu-CNT composites with the RF polymeric binder. After that, selected samples were carbonized at 1050° C. in a N2 ambient for 3 hours, yielding final Cu—C composites.

Salt impregnation method. In the salt impregnation method, undoped (pyrolyzed) CNT-CA monoliths with a CNT loading of ~55 wt % (relative to the carbon binder) and a density of ~25 mg cm$^{-3}$ were initially immersed in an aqueous solution of CuSO4 (0.05-0.20 g g$^{-1}$ water) and subsequently freeze dried in a vacuum chamber. Dried monolithic samples were annealed at 650° C. under N2 for 3 hours to decompose CuSO4 and remove the volatiles. During the annealing step, forming gas may optionally be used to assist in removing oxygen.

Characterization. Monolithic Cu—C composites were machined to yield either macroscopically flat surfaces required for ion beam analysis and indentation or right cylinders needed for X-ray radiography imaging and monolith density measurements. Elemental composition was determined by Rutherford backscattering spectrometry (RBS) with a 2 MeV$^4$He$^+$ beam incident normal to the sample surface and a detector located at 164° from the incident beam direction. The analysis of RBS spectra was done with the RUMP code. Monolith densities were calculated from measurements of sample weights and volumes. Mechanical properties were studied by indentation in the load-controlled mode in an MTS XP nanoindenter with a spherical sapphire indenter tip with a radius of 496 μm. The indentation elastic modulus was calculated based on the initial slope of the unloading curve according to the Oliver-Pharr method. Hardness was defined as average contact pressure at a spherical indentation strain of 25%.

The foam microstructure was examined by a combination of (i) scanning electron microscopy (SEM) with a JEOL 7401-F microscope operated at 2 kV, (ii) bright-field transmission electron microscopy (TEM) with an FEI TF-20 Tecnai micro-scope operated at 200 kV, (iii) X-ray radiography with a Xradia MicroXCT system operated with a tungsten source at a peak voltage of 50 kV, and (iv) ultra-small angle X-ray scattering (USAXS) with a double-crystal Bonse-Hart instrument at beam-line 15ID-D at the Advanced Photon Source, Argonne National Laboratory. For USAXS, the X-ray energy was 16.9 kV. Slit-smeared USAXS data were corrected for background scattering, calibrated against a reference sample, and de-smeared with Irena software tool suite.

Figure 15:
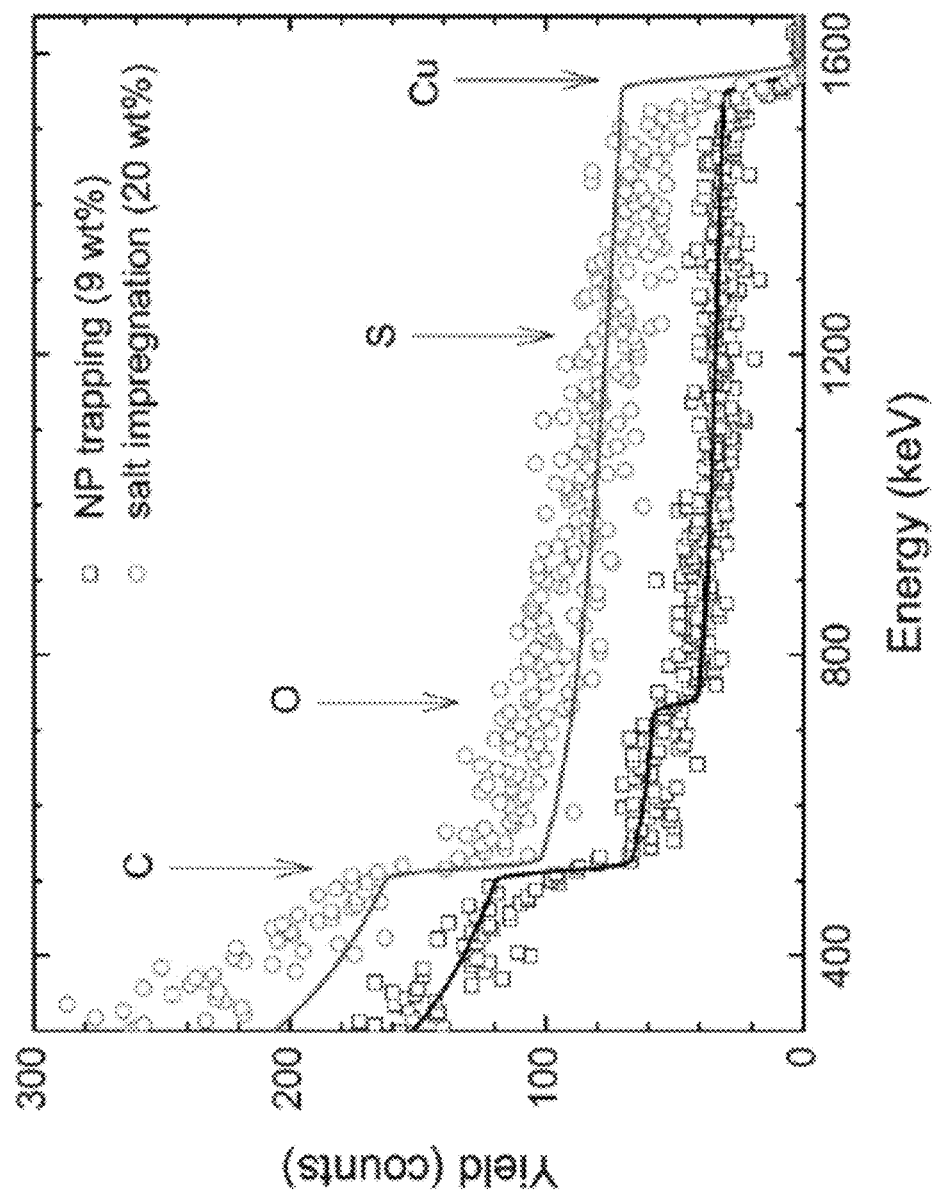
FIG. 15 shows example RBS spectra (symbols) and RUMP code simulations (lines) of Cu—C composites synthesized by NP trapping and salt impregnation methods with monolith densities of ~65 and ~30 mg cm$^{-3}$, respectively. Copper loading values are given in the legend. Surface edges of Cu, S, O, and C are indicated by arrows.
Figure 16:
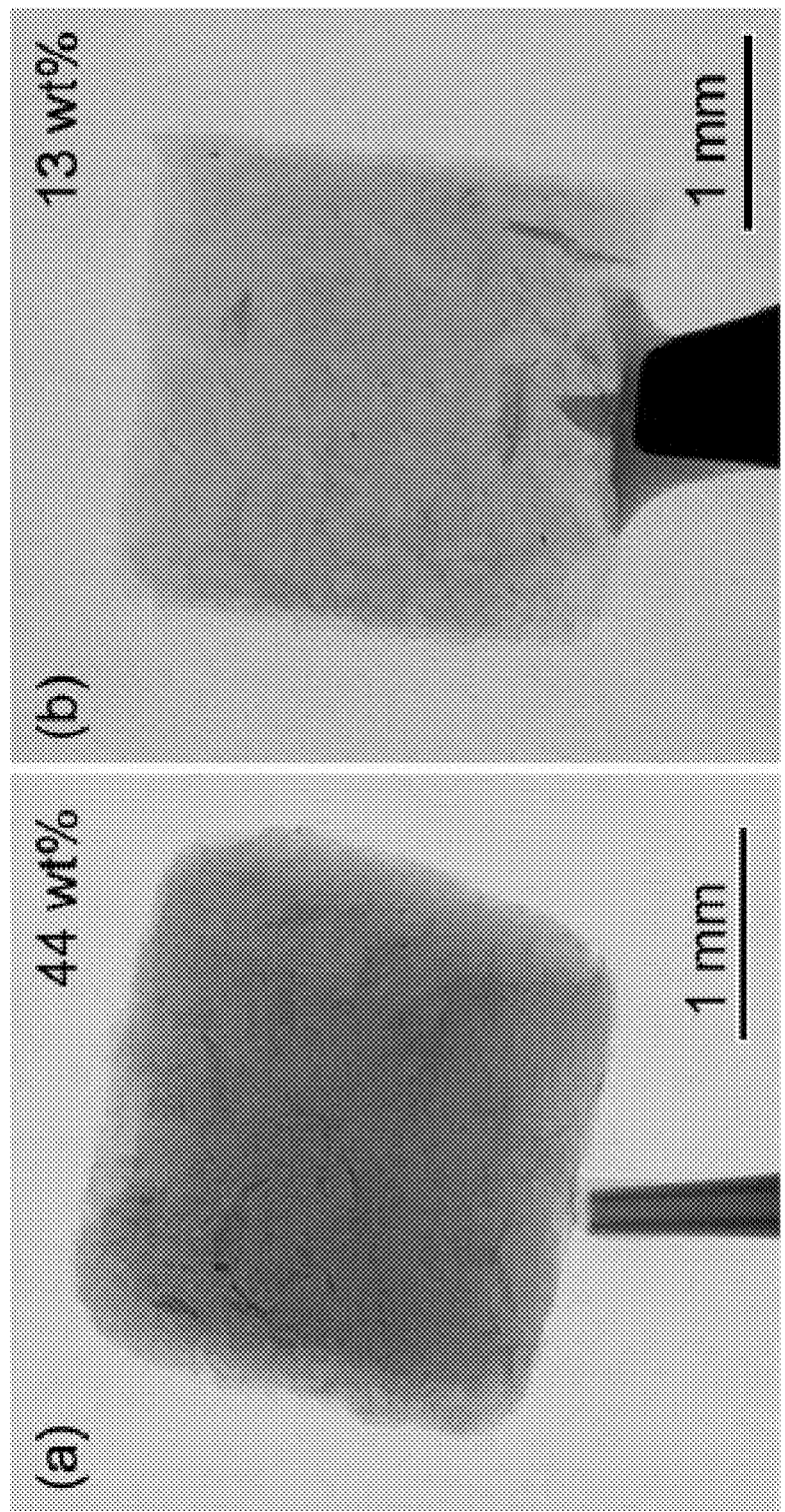
FIG. 16 shows example X-ray radiography images of Cu—C composites synthesized by the salt impregnation method with Cu loadings of 44 and 13 wt % in (a) and (b), respectively. Monolith densities are ~50 and ~40 mg cm$^{-3}$ for (a) and (b), respectively. Both samples are right cylinders glued onto glass stalks.

FIG. 15 shows typical RBS spectra of Cu—C composites synthesized by Cu NP trapping and salt impregnation methods. This figure reveals no traces of either oxygen or sulfur in the sample prepared by salt impregnation, suggesting that CuSO4 has completely decomposed. The RBS spectrum from the sample prepared by the Cu NP trapping method shows oxygen at ~18 wt % due to the fact that this sample has not been carbonized and still contains the RF polymeric binder. In both cases, nano-porous monoliths are uniformly doped with Cu, as revealed by the spectral shape and a negligible variation of spectra collected from different locations and depths in a given monolith. The density uniformity of macroscopic monoliths is further illustrated by FIG. 16, showing X-ray radiographs of the Cu—C composites prepared by the salt impregnation method with two different Cu loadings.

FIGS. 17(a) and 17(c) show SEM images of Cu—C composites prepared by NP trapping and salt impregnation, respectively. These images reveal that, in both cases, the microstructure consists of randomly interconnected nano-ligaments decorated with Cu NPs. Individual NPs are better illustrated by higher magnification TEM images in FIGS. 17(b) and 17(d). The NPs appear dark due to a large atomic mass difference between C and Cu (Z-contrast). Also shown in the inset of FIG. 17(c) is the particle size distribution (PSD) for the CuSO4-derived composite determined by a statistical analysis of SEM images. It reveals a PSD with a volumetric average NP diameter of ~150 nm.

Figure 18:
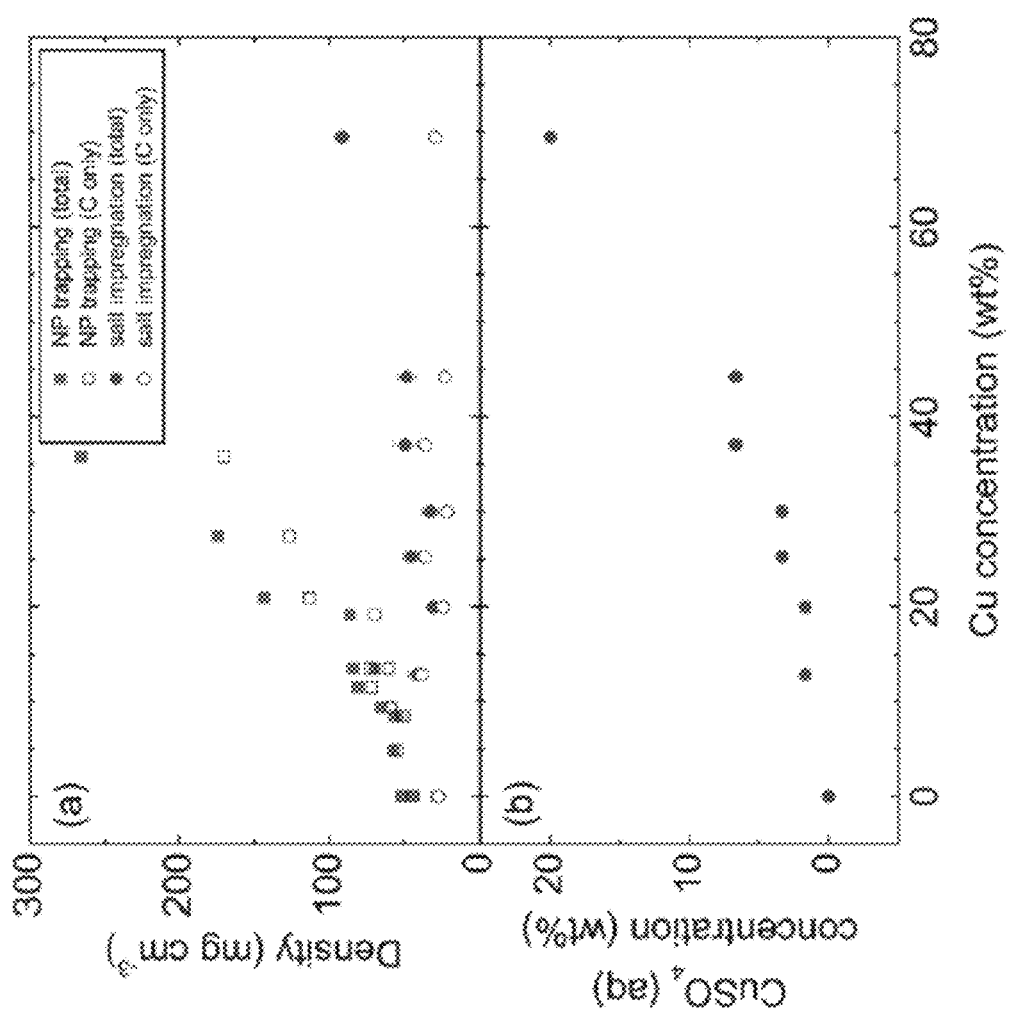
FIG. 18 shows (a) example copper concentration dependence of the monolith density of Cu—C composites (closed symbols) and the densities of their carbonaceous scaffolds (open symbols) for materials synthesized by NP trapping and salt impregnation methods, as indicated in the legend; (b) the dependence of the Cu concentration in Cu—C monoliths on the concentration of $CuSO_4$ in the solution for composites derived by salt impregnation.

It was found that, for the NP trapping method, the addition of the aqueous suspension of Cu NPs to the other sol-gel constituents results in the shrinkage of monoliths (and, hence, in an increased monolith density) during all the three main stages of the synthesis: gelation, solvent extraction, and carbonization. The shrinkage is particularly severe during the carbonization step, converting the RF polymeric component into graphitic carbon. This limits the minimum density of Cu—C composites for any given Cu loading prepared by the NP trapping method. Such a shrinkage is clearly illustrated in FIG. 18(a), showing the increase in both the density of the carbon scaffold and the total density of Cu—C monoliths with increasing Cu loading. The scaffold shrinkage becomes particularly pronounced for Cu loadings of ≥10 wt %. The exact mechanism of such catalytic effects of Cu NPs or the PAA surfactant resulting in monolith shrinkage is not presently clear. However, the salt impregnation method that overcomes this density limitation.

It was found that Cu—C composites made by salt impregnation exhibit negligible shrinkage during all the main synthesis steps: CNT-CA wetting with an aqueous salt solution, freeze drying, and thermal decomposition of CuSO4 [FIG. 18(a)]. FIG. 18(b) illustrates that the density of the resultant Cu—C composites scales with the Cu loading up to ~100 mg cm$^{-3}$ (the maximum Cu loading used in this study). Moreover, the reddish color of Cu—C composites suggests that the decomposition of CuSO4 leads primarily to the formation of Cu or Cu2O NPs instead of expected CuO (which is black in color). This could be attributed to the presence of carbon that acts as an oxygen reduction agent, effectively smelting Cu oxides.

Figure 19:
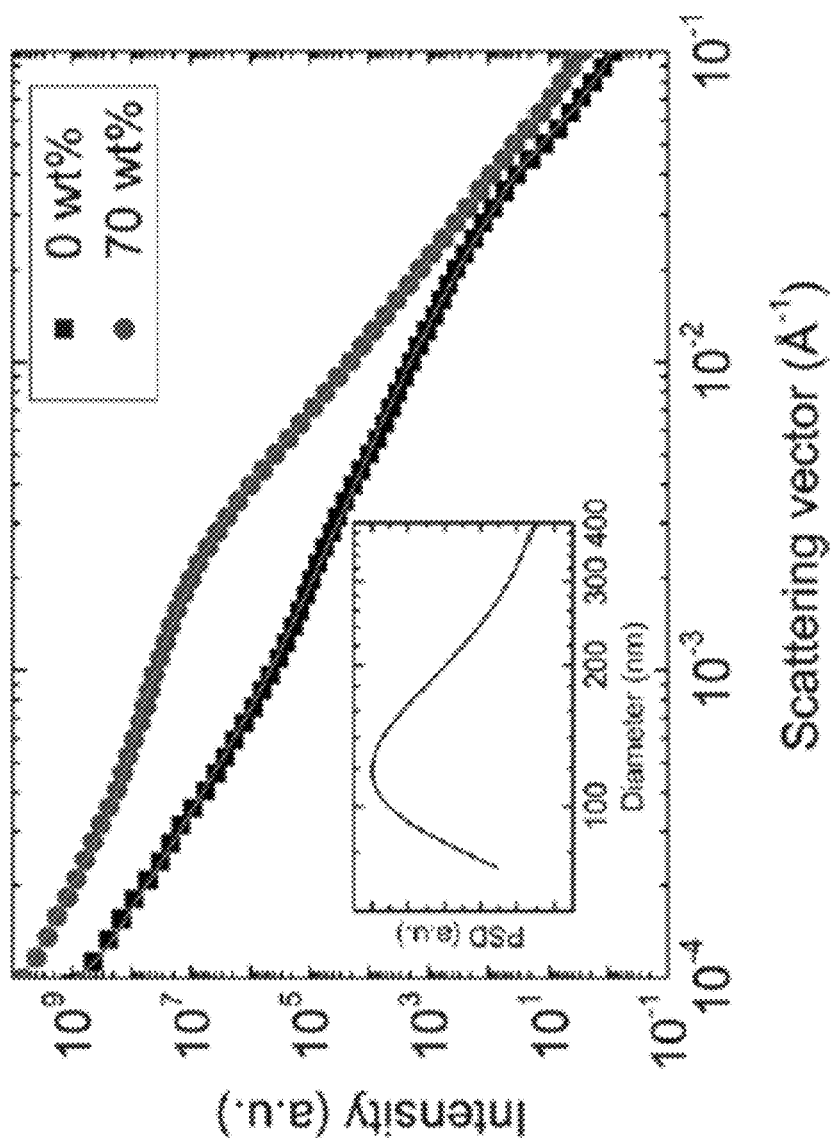
FIG. 19 shows example USAXS curves of an undoped CNT-CA and a Cu—C composite sample synthesized by the salt impregnation method with a Cu loading of 70 wt %. Monolith densities are ~25 and ~95 mg cm$^{-3}$ for these two samples. Symbols are experimental data, and solid lines are fits with a model describing the aerogel as populations of randomly aligned carbon cylinders and Cu spheres. The inset shows the volumetric PSD for Cu NPs in this model.

To complement electron microscopy observations, the morphology of CNT-CAs and Cu—C composites made by salt impregnation has been studied by X-ray scattering, which is one of the most common tools for studying aerogel morphology. FIG. 19 shows representative USAXS curves for an undoped CNT-CA and a Cu—C composite with a Cu loading of 70 wt %. The profiles in FIG. 19 reflect the complex morphology of these aerogels. The profile from the undoped CNT-CA exhibits a Guinier knee at a scattering vector q of ~2×10$^{-2}$ Å$^{-1}$ and a Porod power-law region with a slope close to −4 at q>5×10$^{-2}$ Å$^{-1}$, reflecting scattering from surfaces of CNT-CA nano-ligaments. FIG. 19 further shows that the overall scattering intensity of the Cu—C composite is larger than that of the CNT-CA, which is consistent with a larger scattering contrast of Cu than C. Another Guinier knee, which is associated with Cu NPs, is seen at lower q of ~2×10$^{-3}$ Å$^{-1}$ in the USAXS profile for the Cu—C composite.

Figure 17:
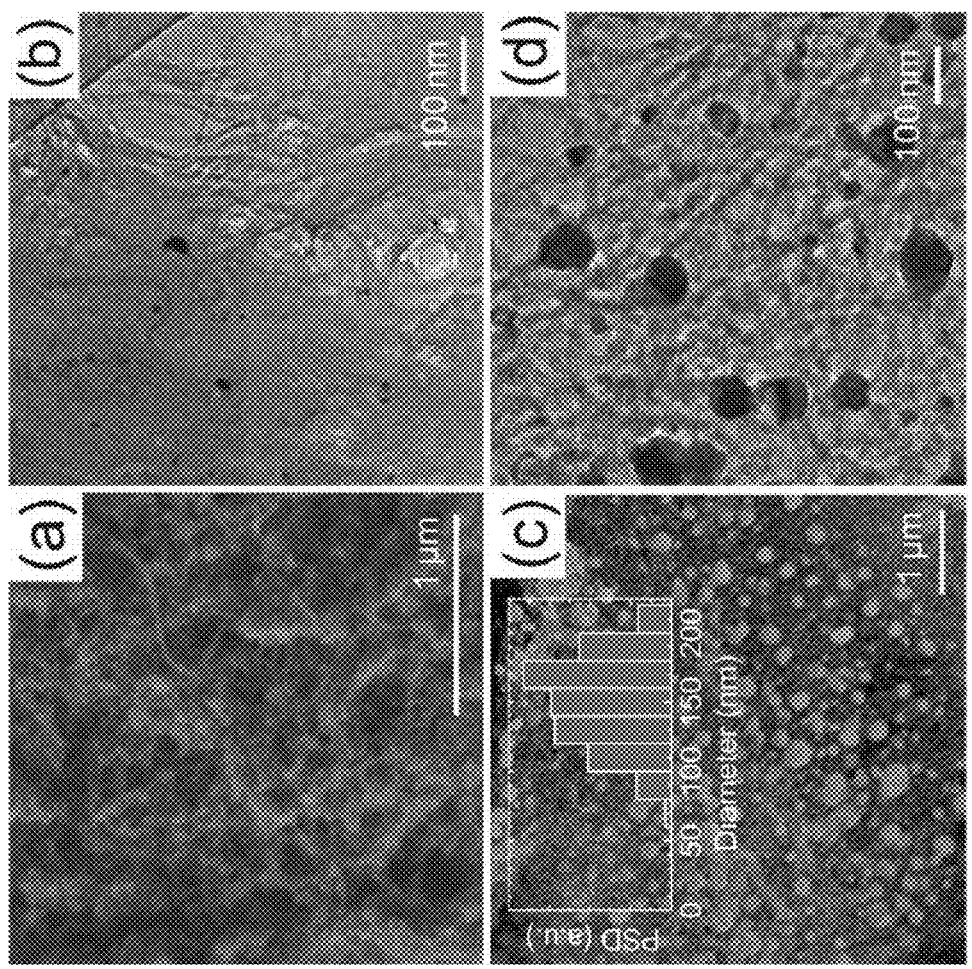
FIG. 17 shows example SEM [(a) and (c)] and TEM [(b) and (d)] images of Cu—C composites synthesized by NP trapping [(a) and (b)] and salt impregnation [(c) and (d)] methods. The inset in (c) shows the volumetric PSD for Cu NPs in the sample synthesized by salt impregnation. Monolith densities are ~65, ~65, ~95 and ~50 mg cm$^{-3}$ (and Cu loadings are ~9, ~9, ~70, and ~35 wt %) for [(a)-(d)], respectively.

USAXS profiles from FIG. 19 have been analyzed with Irena software tool suite with an assumption of a scattering population comprising of spherical Cu particles and carbon cylinders with a length of ~1 µm, in accordance with electron microscopy results of FIG. 17, although the result was not sensitive to the cylinder length. The log-normal size distribution of these scatterers has been obtained by fitting experimental USAXS profiles to the scattering model with a least-square algorithm. An additional unified level model with a slope of ~−3.4 has been used to fit the scattering curve in the low q region (q<$10^{-3}$ Å$^{-1}$), accounting for scattering from larger scale agglomerates of nano-ligaments. The structural parameters derived from such a fitting procedure are given in Table 1, while the Cu PSD is shown in the inset of FIG. 19. A comparison of insets in FIGS. 17(c) and 19 reveals good agreement between PSDs measured by SEM and USAXS. Importantly, the agreement between USAXS and TEM results suggests that electron microscopy observations of FIG. 17 are representative of the ligament morphology in macroscopic samples despite the inherently microscopic volumes studied by electron microscopy.

TABLE 1

Parameters of USAXS profile fitting with a model described in the text

| Sample | CNT-CA | Cu—C composite |
|---|---|---|
| Monolith density (mg cm$^{-3}$) | 25 | 95 |
| Cu loading (wt %) | 0 | 70 |
| Mean C ligament diameter (nm) | 27.6 | 27.6 |
| FWHM of mean C ligament diameter (nm) | 7.8 | 7.8 |
| Mean Cu NP diameter (nm) | — | 215 |
| FWHM of Cu NP diameter (nm) | — | 138.2 |

Figure 20:
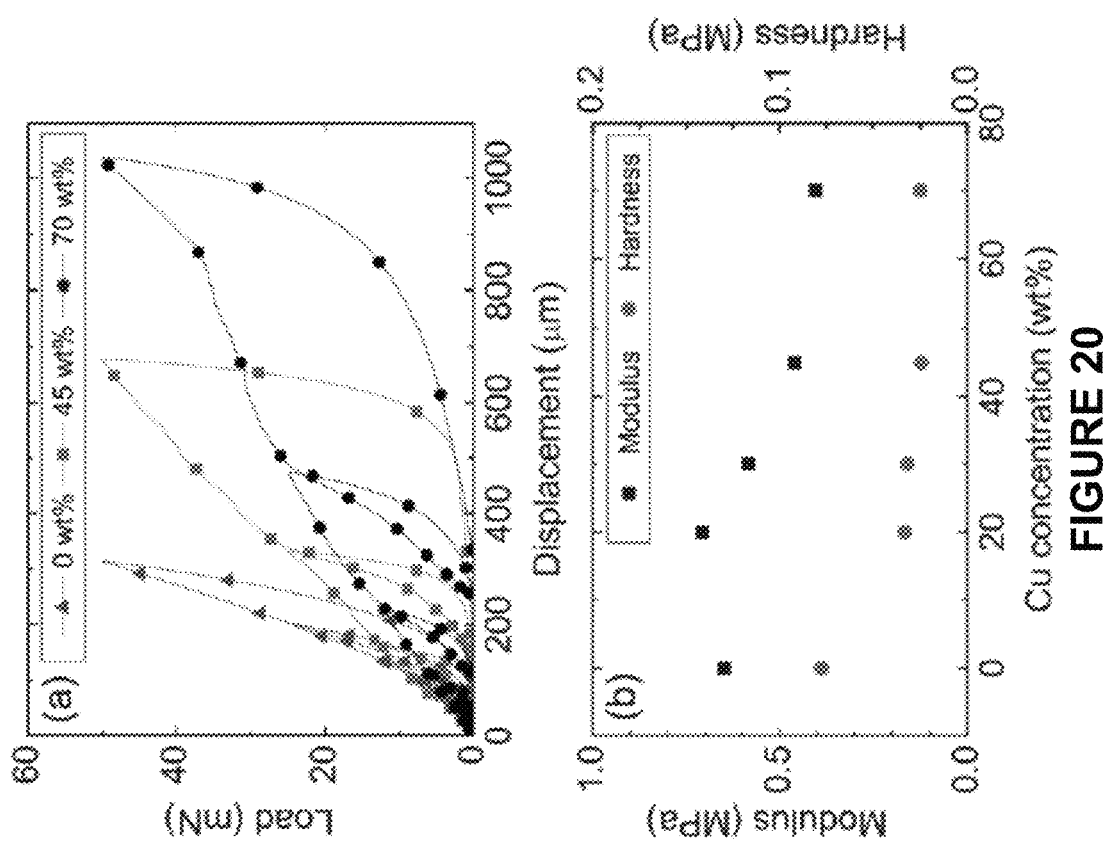
FIG. 20 shows (a) example load—displacement curves of Cu—C composites synthesized by the salt impregnation method with Cu loadings indicated in the legend. Indentation was performed with a 496 μm-radius-spherical indenter as a series of loading cycles with increasing maximum loads and complete unloading at the end of each load cycle; (b) the dependence of Young's modulus on the Cu concentration for Cu—C monoliths (with the same density of the carbon scaffold of ~25 mg cm$^{-3}$ prepared by the salt impregnation method.

FIG. 20(a) shows representative load-displacement curves of Cu—C composites with different Cu loadings synthesized by salt impregnation. The deformation behavior of the undoped CNT-CA scaffold subjected to wetting with pure water (without the CuSO4 salt) and subsequent freeze-drying is qualitatively identical to that of as-prepared CNT-CAs studied in detail previously. Deformation is characterized by a highly elastic response when the monolith shape is restored on unloading despite some energy dissipation occurring during load-unload cycles. Inelastic deformation is evidenced as discontinuities along the loading branch and a finite residual impression after complete unloading. FIG. 20(a) clearly shows that inelasticity becomes more pronounced with increasing Cu concentration. As a result, both modulus and hardness are reduced with increasing Cu loading and monolith density [FIG. 20(b)]. This is consistent with electron microscopy observations in FIGS. 17(c) and 17(d) that Cu NPs do not form a continuous load-bearing substructure or new interconnects between nano-ligaments but rather deposit on the CNT-CA scaffold as isolated NPs. Moreover, FIG. 20(b) reveals that such sulfate-derived Cu NPs mechanically weaken the carbon scaffold, which could be attributed to possible carbon loss during the decomposition of CuSO4 and reduction of Cu oxides (i.e., the Cu smelting process).

In conclusion, it was demonstrated that two related methods to synthesize nanoporous Cu—C composites by (i) the trapping of Cu NPs during the gelation of CNT-CAs and (ii) the impregnation of CNT-CA monoliths with an aqueous solution of CuSO4 followed by freeze-drying to remove water and thermal decomposition of the salt. The NP trapping method has limitations on the minimum monolith density for a given Cu loading. The salt impregnation method overcomes this limitation, affording Cu—C monoliths with densities equivalent to the original densities of the carbon scaffolds and Cu loadings that can be accurately set over a large range.

As used herein, the singular terms "a," "an," and "the" include plural referents unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations, which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scopes of this invention.

What is claimed is:

1. A metal-carbon composite, comprising (i) a porous scaffold comprising one or more of carbon nanotubes, graphene and graphene oxide, and (b) metal nanoparticles of pure metal disposed on said porous scaffold, wherein the metal nanoparticles are obtained from reduction of a metal salt in a gel that comprises the metal salt and the one or more of carbon nanotubes, graphene and graphene oxide, wherein the metal-carbon composite has a density of 1 g/cm$^3$ or less, and wherein the metal nanoparticles account for 1 wt. % or more of the metal-carbon composite.

2. The composite of claim 1, wherein the pure metal is selected from the group consisting of Cu, Ag, Au, Pt, Pd, Co, Ni, W, Mo, Fe, and Ru.

3. The composite of claim 1, wherein the pure metal is selected from the group consisting of Cu, Ag, Au, and Pt.

4. The composite of claim 1, wherein the porous scaffold comprising a three-dimensional network of graphene sheets crosslinked by covalent bonds.

5. The composite of claim 1, wherein the porous scaffold comprising a three-dimensional network of graphene oxide sheets crosslinked by covalent bonds.

6. The composite of claim 1, wherein the porous scaffold comprising a three-dimensional network of carbon nanotubes crosslinked by carbon nanoparticles.

7. The composite of claim 1, wherein the metal-carbon composite has a density of 100 mg/cm$^3$ or less, and wherein the metal nanoparticles account for 5 wt. % or more of the metal-carbon composite.

8. The composite of claim 1, wherein carbon and metal account for 90 at. % or more of the metal-carbon composite.

9. A method for making the metal-carbon composite of claim 1, comprising (a) providing an aqueous mixture comprising (i) at least one of carbon nanotube and graphene oxide and (ii) at least one metal salt; (b) freezing the mixture to obtain a cryogel; (c) drying the cryogel to obtain a dry gel; and (d) reducing the dry gel to obtain the metal-carbon composite.

10. The method of claim 9, wherein the metal salt is a copper or silver salt.

11. The method of claim 9, wherein step (d) comprises pyrolyzing the dry gel in a reducing environment.

12. A method for making the metal-carbon composite of claim 1, comprising (a) providing an aqueous mixture comprising (i) graphene oxide, (ii) at least one metal salt, and (iii) at least one catalyst; (b) curing the reaction mixture to produce a wet gel; (c) washing and drying the wet gel to obtain a metal-graphene oxide aerogel comprising a graphene oxide scaffold.

13. The method of claim 12, wherein the metal salt is a gold salt.

14. The method of claim 12, further comprising (d) reducing the metal-graphene oxide aerogel to produce a metal-graphene aerogel comprising a graphene scaffold, wherein carbon and metal account for 90 at. % or more of the metal-graphene aerogel.

15. The method of claim 12, further comprising (e) removing the graphene oxide scaffold to obtain a metal aerogel.

16. A method for making the metal-carbon composite of claim 1, comprising (a) providing a carbon aerogel; (b) immersing said carbon aerogel in an aqueous metal salt solution; (c) freeze drying the carbon aerogel in a vacuum to obtain a metal salt-impregnated carbon aerogel; and (d) reducing the metal salt-impregnated carbon aerogel to obtain the metal-carbon composite.

17. The method of claim 16, wherein the metal salt is selected from platinum salt and copper salt.

\* \* \* \* \*